US012218431B2

(12) United States Patent
Chang et al.

(10) Patent No.: US 12,218,431 B2
(45) Date of Patent: Feb. 4, 2025

(54) ANTENNA SUBSYSTEM WITH IMPROVED RADIATION PERFORMANCES

(71) Applicant: MEDIATEK Inc., Hsinchu (TW)

(72) Inventors: Wei-Hsuan Chang, Hsinchu (TW); Cheng-Han Lee, Hsinchu (TW); Chih-Wei Lee, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 152 days.

(21) Appl. No.: 18/161,108

(22) Filed: Jan. 30, 2023

(65) Prior Publication Data

US 2024/0258712 A1 Aug. 1, 2024

(51) Int. Cl.

*H01Q 1/24* (2006.01)
*H01Q 21/06* (2006.01)
*H01Q 21/08* (2006.01)

(52) U.S. Cl.

CPC ........... *H01Q 21/065* (2013.01); *H01Q 1/241* (2013.01); *H01Q 21/08* (2013.01)

(58) Field of Classification Search

CPC ............ H01Q 1/24; H01Q 1/241; H01Q 1/38; H01Q 21/06; H01Q 21/065; H01Q 21/08

See application file for complete search history.

(56) References Cited

U.S. PATENT DOCUMENTS

| | | | | |
|---|---|---|---|---|
| 10,243,264 B2 * | 3/2019 | Foore | ...................... | H01Q 5/392 |
| 10,594,028 B2 * | 3/2020 | Yong | ...................... | H01Q 1/38 |
| 10,804,609 B1 * | 10/2020 | Nosrati | ...................... | H01Q 3/26 |
| 11,177,566 B2 * | 11/2021 | Wu | ...................... | H01Q 1/38 |
| 11,367,956 B2 * | 6/2022 | Mattox | ...................... | H01Q 1/24 |
| 11,594,815 B2 * | 2/2023 | Irci | ...................... | H04M 1/026 |
| 2020/0244327 A1 * | 7/2020 | Bøjer | ...................... | H01Q 9/30 |

* cited by examiner

*Primary Examiner* — Tho G Phan

(74) *Attorney, Agent, or Firm* — McClure, Qualey & Rodack, LLP

(57) ABSTRACT

The invention provides an antenna subsystem with improved radiation performances. The antenna subsystem may comprise an antenna-in-module (AiM), an auxiliary structure being conductive, and a support structure being nonconductive and disposed between the AiM and the auxiliary structure. The AiM may comprise a base, and one or more radiators being conductive. The antenna subsystem may provide a spherical coverage by a combination of a first component of gain and a second component of gain. The auxiliary structure may be insulated from the one or more radiators, and may be configured for orienting a radiation pattern of the first component of gain and a radiation pattern of the second component of gain to two different directions respectively; and/or, causing the spherical coverage provided by the antenna subsystem to be broader than a spherical coverage provided by the AiM alone.

14 Claims, 18 Drawing Sheets

ANTENNA SUBSYSTEM WITH IMPROVED RADIATION PERFORMANCES

FIELD OF THE INVENTION

The present invention relates to an antenna subsystem with improved radiation performances; more particularly, to an antenna subsystem comprising an antenna-in-module (AiM), a conductive auxiliary structure, and a nonconductive support structure disposed between the AiM and the auxiliary structure, wherein the AiM may comprise one or more radiators for wireless communication of, e.g., millimeter-wave (mmW), the antenna subsystem may provide a spherical coverage by a combination of a first component of gain and second component of gain, and the auxiliary structure may be configured for orienting the first component of gain and the second component of gain to two different directions respectively, and/or, causing the spherical coverage provided by the antenna subsystem to be broader than a spherical coverage provided by the AiM alone.

BACKGROUND OF THE INVENTION

More contemporary electronic devices require functionality of wireless communication, and electronic devices which require functionality of wireless communication need antennas for transmitting and/or receiving electromagnetic waves. How to improve antenna performances is therefore important for development of electronic device.

SUMMARY OF THE INVENTION

An aspect of the invention is providing an antenna subsystem (e.g., 100, 200, 300, 400, 600 or 700 in FIG. 1*a*, 2*a*, 3*a*, 4*a*, 6*a* or 7*a*) with improved radiation performances; the antenna subsystem may comprise an antenna-in-module (AiM, e.g., 110 in FIG. 1*a*, 2*a*, 3*a*, 4*a*, 6*a* or 7*a*), an auxiliary structure (e.g., 130, 230, 330, 430, 630 or 730 in FIG. 1*a*, 2*a*, 3*a*, 4*a*, 6*a* or 7*a*), and a support structure (e.g., 120, 220, 320, 420, 620 or 720 in FIG. 1*a*, 2*a*, 3*a*, 4*a*, 6*a* or 7*a*). The auxiliary structure may be conductive. The support structure may be nonconductive (e.g., dielectric), and may be disposed between the AiM and the auxiliary structure. The AiM may comprise a base (e.g., 112 in FIG. 1*a*, 2*a*, 3*a*, 4*a*, 6*a* or 7*a*), and one or more radiators (e.g., a[1] to a[N] in FIG. 1*a*, 2*a*, 3*a*, 4*a*, 6*a* or 7*a*). The one or more radiators may be conductive. The antenna subsystem may provide a spherical coverage by a combination of a first component of gain and a second component of gain. The auxiliary structure may be insulated from the one or more radiators, and may be configured for orienting a radiation pattern (e.g., G2_phi, G3_phi or G4_phi in FIG. 2*h*, 3*h* or 4*e*) of the first component of gain and a radiation pattern (e.g., G2_theta, G3_theta or G4_theta in FIG. 2*h*, 3*h* or 4*e*) of the second component of gain to two different directions (e.g., d21 and d22 in FIG. 2*i*, d31 and d32 in FIG. 3*i*, or d41 and d42 in FIG. 4*f*) respectively.

In an embodiment (e.g., 200 or 600), the auxiliary structure may comprise an upper front structure (e.g., 232 in FIG. 2*a* or 6*a*) arranged to be an electromagnetic director for the radiation pattern of the first component of gain.

In an embodiment (e.g., 300, 400 or 700), the auxiliary structure may comprise an upper front structure (e.g., 332 in FIG. 3*a*, or 432 in FIG. 4*a* or 7*a*) arranged to be an electromagnetic reflector for the radiation pattern of the first component of gain.

In an embodiment (e.g., 400 or 700), the upper front structure (e.g., 432 in FIG. 4*a* or 7*a*) may further be arranged to be an electromagnetic director, or an electromagnetic reflector, for the radiation pattern of the second component of gain.

In an embodiment (e.g., 200, 300, 400, 600 or 700), the one or more radiators may be placed on a front surface (e.g., sb1 in FIG. 2*a*) of the base, and at least one (e.g., d21 in FIG. 2*i*, d31 in FIG. 3*i*, or d41 and d42 in FIG. 4*f*) of the two different directions may be substantially nonparallel to a forward direction (e.g., df1 in FIG. 2*i*, 3*i* or 4*f*) which may be perpendicular to the front surface of the base.

In an embodiment (e.g., 100, 200, 300, 400, 500, 600 or 700), the first component of gain may be contributed by phi-direction electrical field, and the second component of gain may be contributed by theta-direction electrical field.

In an embodiment (e.g., 200 or 600), the one or more radiators may distribute along an array direction (e.g., da1 in FIG. 2*a*). The front surface (e.g., sb1) of the base (e.g., 112) may be perpendicular to a forward direction (e.g., df1 in FIG. 2*a*). The auxiliary structure may comprise an upper front structure (e.g., 232 in FIG. 2*a* or 6*a*). On a geometric plane (e.g., sr1 in FIG. 2*h*) perpendicular to the array direction, a position of the upper front structure may be away from a position of the one or more radiators along an upward-forward direction (e.g., r2 in FIG. 2*f* or 2*i*), and the upper front structure may be arranged to direct the radiation pattern of the first component of gain to another upward-forward direction (e.g., d21 in FIG. 2*h* or 2*i*).

In an embodiment (e.g., 300, 400 or 700), the auxiliary structure may comprise an upper front structure (e.g., 332 or 432 in FIG. 3*a* or 4*a*). On a geometric plane (e.g., sr1 in FIG. 3*h* or 4*e*) perpendicular to the array direction, a position of the upper front structure may be away from a position of the one or more radiators along an upward-forward direction (e.g., r3 in FIG. 3*f* or 3*i*, or r4 in FIG. 4*d* or 4*f*), and the upper front structure may be arranged to reflect the radiation pattern of the first component of gain to a downward-forward direction (e.g., d31 in FIG. 3*h* or 3*i*, or d41 in FIG. 4*e* or 4*f*).

In an embodiment (e.g., 400 or 700), on the geometric plane perpendicular to the array direction, the upper front structure may be further arranged to direct the radiation pattern of the second component of gain to another upward-forward direction (e.g., d42 in FIG. 4*e* or 4*f*), or to reflect the radiation pattern of the second component of gain to another downward-forward direction.

In an embodiment (e.g., 200 or 600), the auxiliary structure (e.g., 230 or 630 in FIG. 2*a* or 6*a*) may comprise one or more thin members (e.g., p[1] to p[K] in FIG. 2*a* or 6*a*) which may be mutually insulated. The one or more thin members may be disposed on a predetermined surface (e.g., sc2 in FIG. 2*a* or 6*a*) of the support structure, and may distribute substantially along the array direction. The predetermined surface may be perpendicular to a direction (e.g., an x-direction in FIG. 2*a* or du1 in FIG. 6*a*) substantially nonparallel (e.g., substantially perpendicular) to the forward direction.

In an embodiment (e.g., 200 or 600), the support structure may comprise a cap (e.g., 222 in FIG. 2*a* or 6*a*); the cap may comprise an open cavity (e.g., 124 in FIG. 2*d* or 2*e*), and the cap may be enclosed by a combination of a plurality of cap outward surfaces. The plurality of cap outward surfaces may comprise a cap front surface (e.g., sc1 in FIG. 2*c*), a cap rear surface (e.g., sc6 in FIG. 2*d*) having a cavity opening (e.g., 126 in FIG. 2*d* or 2*e*), one or more cap side surfaces (e.g., sc2 to sc5 in FIGS. 2*d* and 2*e*) extending between a perimeter of the cap front surface and a perimeter of the cap rear surface, a cavity end surface (e.g., sc11 in FIG. 2*d* or 2*e*), and one or more cavity side surfaces (e.g., sc7 to sc10 in FIGS. 2*d* and 2*e*) extending from a perimeter of the cavity opening to a perimeter of the cavity end surface. An outward surface (e.g., sb1) of the AiM may be attached to the cavity end surface. The predetermined surface (e.g., sc2) may be one of the one or more cap side surfaces.

In an embodiment (e.g., 300, 400 or 700), the auxiliary structure may comprise a long thin member (e.g., pc1 in FIG. 3*a* or pc41 in FIG. 4*a* or 7*a*). The long thin member may be disposed on a first surface (e.g., sc2 in FIG. 3*a* or si1 in FIG. 4*a* or 7*a*) of the support structure, and may extend substantially along the array direction, wherein the first surface may be perpendicular to a first direction (e.g., the x-direction in FIG. 3*a*, or du1 in FIG. 4*a* or 7*a*), and the forward direction and the first direction may be substantially nonparallel (e.g., may be substantially perpendicular).

In an embodiment (e.g., 400 or 700), the auxiliary structure may further comprise a second long thin member (e.g., pc42 in FIG. 4*a* or 7*a*). The second long thin member may be insulated from the long thin member, may be disposed on a second surface (e.g., si2 in FIG. 4*a* or 7*a*) of the support structure, and may extends substantially along the array direction. The second surface may be perpendicular to a second direction (e.g., df1 in FIG. 4*a* or 7*a*), wherein the first direction and the second direction may be substantially nonparallel (e.g., may be substantially perpendicular).

In an embodiment (e.g., 400 or 700), the AiM may be disposed inside a user equipment (UE, e.g., 10 in FIG. 1*c*), the UE may comprise an interior structure (e.g., 424 or 724 in FIG. 4*a* or 7*a*), the support structure may comprise an accessory portion (e.g., 422 in FIG. 4*a* or 7*a*) of the interior structure, and the first surface and the second surface may be two nonparallel surfaces of the accessory portion.

In an embodiment (e.g., 300, 400 or 700), the one or more radiators may distribute along the array direction over a first length (e.g., L1 in FIG. 3*g* or 4*a*), the long thin member may extend substantially along the array direction by a second length (e.g., L2 or L41 in FIG. 3*g* or 4*a*), and the second length may be longer than or equal to the first length.

In an embodiment (e.g., 600 or 700), the auxiliary structure may comprise a forepart structure (e.g., 532 in FIG. 6*a* or 7*a*). The forepart structure may be arranged to be one or more parasitic antennas resonating with the one or more radiators, and to thereby cause the spherical coverage provided by the antenna subsystem to be broader than a spherical coverage provided by the AiM alone.

In an embodiment (e.g., 600 or 700), the auxiliary structure may comprise one or more thin units (e.g., h[1] to h[Q] in FIG. 6*a* or 7*a*). The one or more thin units may be mutually insulated, may be disposed on a predetermined surface (e.g., si3 in FIG. 6*a* or 7*a*) of the support structure, and may distribute substantially along the array direction. The predetermined surface may be substantially parallel to the front surface of the base. The AiM may be disposed inside a user equipment (UE, e.g., 10 in FIG. 1*c*), and the UE may be enclosed by an external surface (e.g., su1 in FIG. 1*c* or 5*d*). Along the forward direction, a distance (e.g., di2) between the predetermined surface (e.g., si3 in FIG. 5*d*) and the external surface (e.g., su1 in FIG. 5*d*) is shorter than a distance (e.g., di1 in FIG. 5*d*) between the front surface (e.g., sb1 in FIG. 5*d*) and the external surface.

In an embodiment (e.g., 600 or 700), each (e.g., h[q] in FIG. 5*f*) of the one or more thin units may comprise an opening (e.g., o[q] in FIG. 5*f*).

An aspect of the invention is providing an antenna subsystem (e.g., 100, 500, 600 or 700 in FIG. 1*a*, 5*a*, 6*a* or 7*a*) with improved radiation performances. The antenna subsystem may comprise an antenna-in-module (AiM, e.g., 110 in FIG. 1*a*, 5*a*, 6*a* or 7*a*), an auxiliary structure (e.g., 130, 530, 630 or 730 in FIG. 1*a*, 5*a*, 6*a* or 7*a*), and a support structure (e.g., 120, 520, 620 or 720 in FIG. 1*a*, 5*a*, 6*a* or 7*a*). The auxiliary structure may be conductive. The support structure may be nonconductive, and may be disposed between the AiM and the auxiliary structure. The AiM may comprise a base (e.g., 112 in FIG. 1*a*, 5*a*, 6*a* or 7*a*), and one or more radiators (e.g., a[1] to a[N] in FIG. 1*a*, 5*a*, 6*a* or 7*a*). The one or more radiators may be conductive. The auxiliary structure may be insulated from the one or more radiators, and may be arranged to cause a spherical coverage provided by the antenna subsystem to be broader than a spherical coverage provided by the AiM alone.

In an embodiment (e.g., 600 or 700), the auxiliary structure may be further arranged to orient a radiation pattern of the first component of gain and a radiation pattern of the second component of gain to two different directions, respectively.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1A:
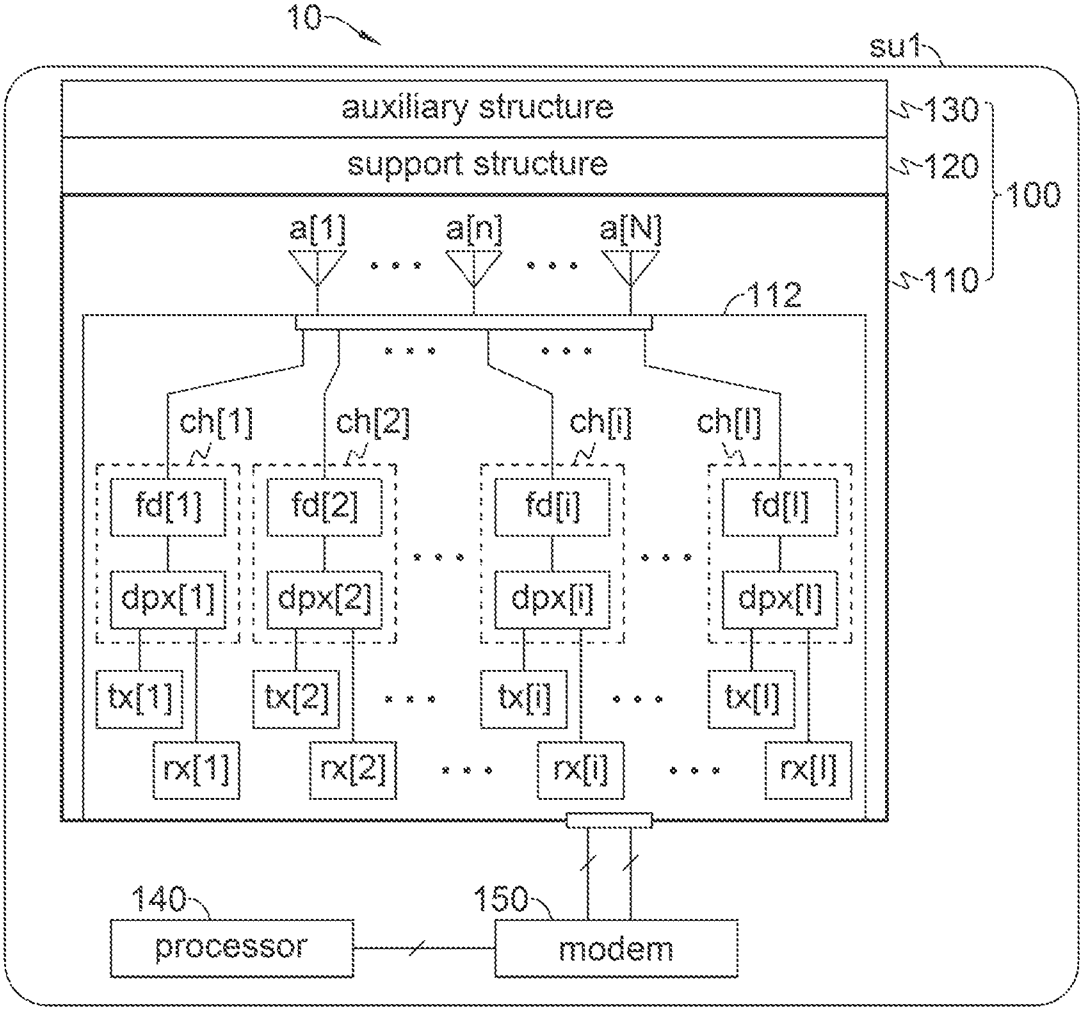
FIGS. 1*a* to 1*c* illustrate various aspects of an antenna-in-module according to an embodiment of the invention.
Figure 1B:
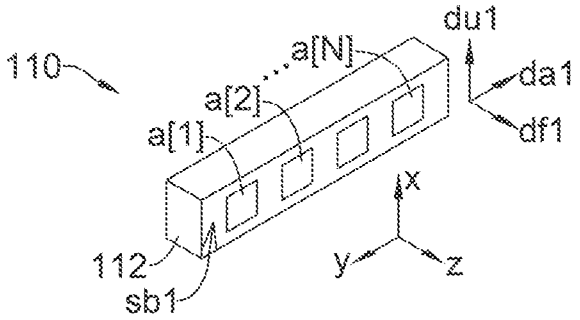
Figure 1C:
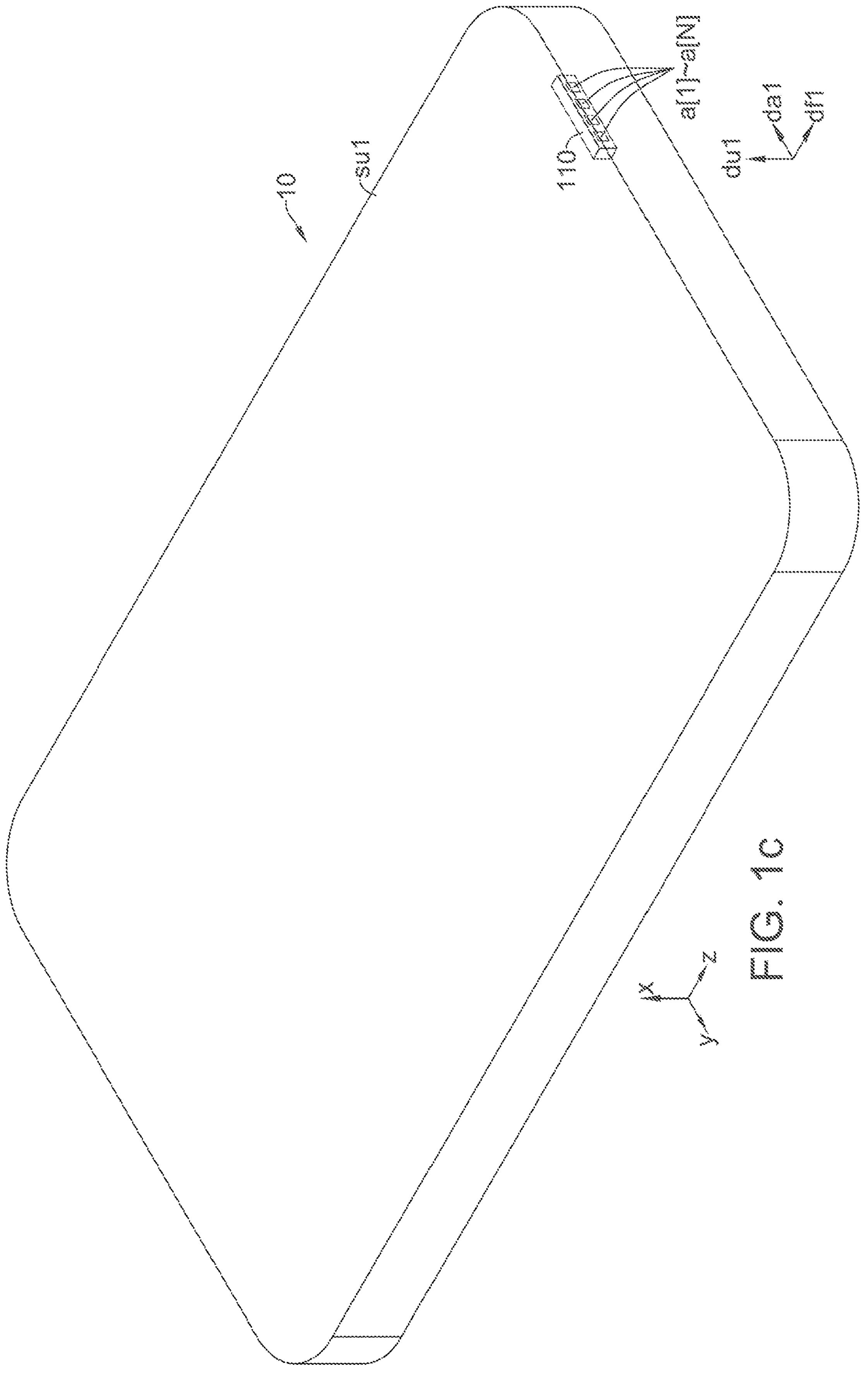

According to an embodiment of the invention, FIG. 1*a* depicts a schematic diagram demonstrating an example of a user equipment (UE) 10; the UE 10 may include an antenna-in-module (AiM) 110, a processor 140 and a modulator-demodulator (modem) 150; FIG. 1*b* depicts a three-dimensional concept view of an example of the AiM 110, and FIG. 1*c* depicts a three-dimensional concept view of an example of installing the AiM 110 in the UE 10. The UE 10 may be a mobile phone, a smart phone, a tablet computer, a notebook computer, a laptop computer, a desktop computer, a wearable gadget (e.g., smart watch, ear phone or glasses, etc.), a drone, a digital camera, a digital camcorder, a set-top box, a smart speaker, a game console, a customer-premises equipment (CPE), a router, an access point, a home appliance (e.g., smart TV, air conditioner, lighting system, refrigerator, washing machine, etc.), an office equipment (e.g., copy machine, printer, audio or video conference system, surveillance system, etc.), an industrial equipment (e.g., assembly line robot), an internet-of-things (IoT) sensor or device, a telematic system, a navigator, or any electronic device which implements functionality of wireless communication, e.g., mobile telecommunication adopting network access technology such as long-term evolution (LTE) and/or new radio (NR) defined by third generation partnership project (3GPP).

As shown in FIG. 1*b*, the AiM 110 may include a base 112 and one or more radiators a[1] to a[N], wherein the index N may be an integer constant greater than or equal to one. For example, in an embodiment, the index N may be configured to equal four. Each of the radiators a[1] to a[N] may be conductive, may be configured to resonate at one or more frequency bands allocated for wireless communication, and may therefore transmit and receive electromagnetic waves at the one or more frequency bands for wireless communication. For example, in an embodiment, the one or more frequency bands may include band(s) in frequency range 2 (FR2) of NR spectrum specified by 3GPP. The radiators a[1] to a[N] may be placed on a front surface sb1 (e.g., a plane parallel to a geometric xy-plane) of the base 112, and may distribute along an array direction da1 (e.g., a direction opposite to a y-direction). For example, the radiators a[1] to a[N] may be linearly distribute along the array direction da1, and distances between every two adjacent ones of the radiators a[1] to a[N] may be equal. The front surface sb1 of the base 112 may be perpendicular to a forward direction df1 (e.g., a direction along a z-direction). As shown in FIGS. 1*b* and 1*c*, the array direction da1 and the forward direction df1 may be perpendicular to an upward direction du1 (e.g., a direction along an x-direction). As shown in FIG. 1*c*, the AiM 110 may be disposed inside the UE 10, and may therefore be enclosed by an external surface su1 of the UE 10; for example, the external surface su1 may be an outward surface of a housing of the UE 10.

As shown in FIG. 1*a*, the base 112 may include one or more channel circuits ch[1] to ch[I], one or more transmission circuits tx[1] to tx[I], and one or more reception circuits rx[1] to rx[I], wherein the index I may be an integer constant greater than or equal to one. Each channel circuit ch[i], for the index variable i being one of 1 to I, may include a radiofrequency (RF) frontend circuit fd[i] and a duplexer dpx[i]. Each channel circuit ch[i] may be coupled to an associated radiator a[n_i] of the radiators a[1] to a[N], with the index variable n_i being one of 1 to N. On the other hand, each radiator a[n], with the index variable n being one of 1 to N, may be coupled to associated one or more of the channel circuits ch[1] to ch[I]. For example, in an embodiment, the index I may equal twice of the index N, and each radiator a[n] of the radiators a[1] to a[N] may be coupled to two associated channel circuits ch[2*n−1] and ch[2*n] of the channel circuits ch[1] to ch[2*N], and may therefore support two multi-input multi-output (MIMO) channels. In each channel circuit ch[i], the frontend circuit fd[i] may weight a signal (not depicted) by adjusting a phase and/or a magnitude of the signal, wherein the signal may be from the associated radiator a[n_i] to the duplexer dpx[i], or from the duplexer dpx[i] to the radiator a[n_i]. In each channel circuit ch[i], the duplexer dpx[i] may be coupled between the RF frontend circuit fd[i], the transmission circuit tx[i] and the reception circuit rx[i]; the duplexer dpx[i] may control (e.g., conditionally enable and/or disable) a wired electrical conduction between the transmission circuit tx[i] and the RF frontend circuit fd[i], and may control a wired electrical conduction between the RF frontend circuit fd[i] and the reception circuit rx[i]. Each transmission circuit tx[i] may include a power amplifier (not depicted), and each reception circuit rx[i] may include a low-noise amplifier (not depicted).

In the UE 10, the modem 150 may be coupled between the processor 140 and the base 112 of the AiM 100. The processor 140 may control operations of the UE 10. When the UE 10 needs to transmit outgoing information (e.g., data, messages, and/or multimedia streams, etc.) to a remote participant (e.g., a base station, an access point, or another UE, etc., not depicted) of a wireless communication network (e.g., a mobile telecommunication network, etc.), the processor 140 may cause the modem 150 to form one or more transmitting signals (not depicted) sent to one or more of the transmission circuits tx[1] to tx[I], one or more of the channel circuits ch[1] to ch[1] and then one or more of the radiators a[1] to a[N] to be amplified, be weighted and be transformed to outgoing electromagnetic waves, respectively. When the UE 10 needs to receive incoming information from a remote participant (not depicted) of the wireless communication network, one or more of the radiators a[1] to a[N] may receive incoming electromagnetic waves to form one or more incoming signals (not depicted) sent to one or more of the channel circuits ch[1] to ch[1] and one or more the reception circuits rx[1] to rx[I] to be weighted and be amplified to form one or more received signals (not depicted); the modem 150 may process the one or more received signals for the processor 140 to obtained information embedded in the incoming electromagnetic waves. Though not depicted for conciseness, the UE 10 may further comprise other circuit(s), hardware(s), sensor(s) and/or peripheral(s), such as one or more memories, power management circuit, graphic processor(s), signal processor(s), microphone(s), speaker(s), camera(s), touch sensor(s), display panel(s), etc.

Modularizing the radiators a[1] to a[N], the channel circuits ch[1] to ch[1], the transmission circuits tx[1] to tx[I], and the reception circuit rx[1] to rx[I] into the AiM 110 may ease implementation and deployment of wireless communication functionality, and may benefit assembly of the UE 10; e.g., may lower production cost and time of UE. Moreover, according to the invention, additionally accompanying the AiM 110 with a support structure 120 and an auxiliary structure 130 to jointly form an antenna subsystem 100 as shown in FIG. 1*a* may further improve radiation performances of the AiM 100 at one or more frequency bands of wireless telecommunication. For example, at one or more frequency bands of wireless communication, a cumulative distribution function (CDF) of the antenna subsystem 100 may therefore be better than a CDF of the AiM 100 alone.

The auxiliary structure 130 may be conductive, and may be insulated from the radiators a[1] to a[I]. The support structure 120 may be nonconductive (e.g., dielectric), and may be disposed between the AiM 110 and the auxiliary structure 130. As the antenna subsystem 100 may provide a spherical coverage, e.g., CDF of effective isotropic radiated power (EIRP), by a combination of a first component of gain (e.g., a component of gain contributed by phi-direction electrical field) and a second component of gain (e.g., a component of gain contributed by theta-direction electrical field) at frequency band(s) of wireless communication, the auxiliary structure 120 may be configured for orienting a radiation pattern of the first component of gain and a radiation pattern of the second component of gain to two different directions respectively, and/or, may cause the spherical coverage provided by the antenna subsystem 100 to be broader than a spherical coverage provided by the AiM 110 alone. Details of the support structure 120 and the auxiliary structure 130 may be understood by various embodiments described below.

Figure 2A:
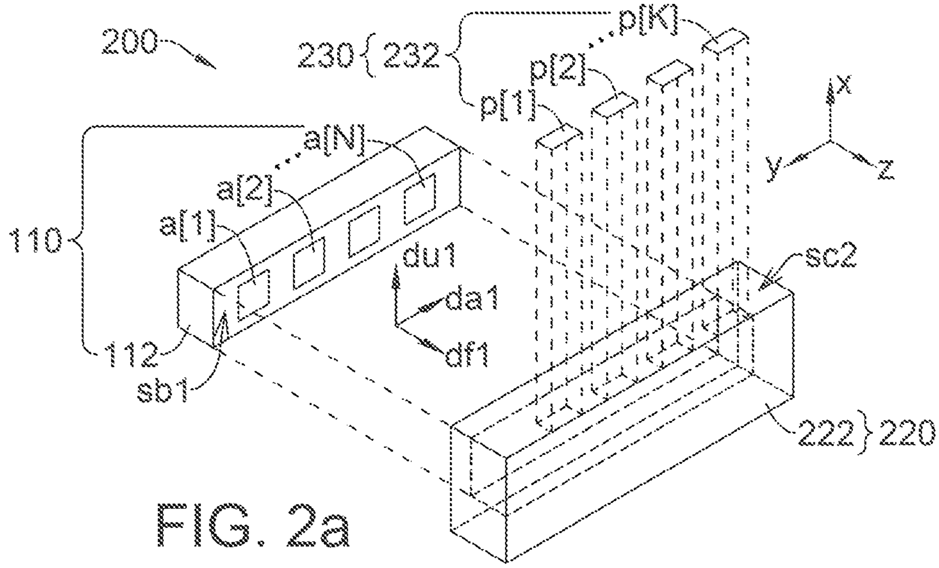
FIGS. 2*a* to 2*i* illustrate various aspects of an antenna subsystem according to an embodiment of the invention.

FIGS. 2*a* to 2*i* illustrate various aspects of an antenna subsystem 200 according to an embodiment of the invention. FIG. 2*a* depicts an exploded view of the antenna subsystem 200; the antenna subsystem 200 may include the AiM 110 (previously described by referring to FIGS. 1*a* to 1*c*), a support structure 220 and an auxiliary structure 230. The antenna subsystem 200 may implement the antenna subsystem 100 shown in FIG. 1*a*, wherein the support structure 220 and the auxiliary structure 230 may implement the support structure 120 and the auxiliary structure 130, respectively. As shown in FIG. 2*a*, the support structure 220 may include a cap 222, the auxiliary structure 230 may include an upper front structure 232, and the upper front structure 232 may include one or more thin members p[1] to p[K], wherein the index K may be an integer constant greater than or equal to one. For example, in an embodiment, as the AiM 110 may include the radiators a[1] to a[N], the index K may equal the index N. Each of the thin members p[1] to p[K] may be conductive; the thin members p[1] to p[K] may be mutually insulated, and may be insulated from the radiators a[1] to a[N].

Figure 2B:
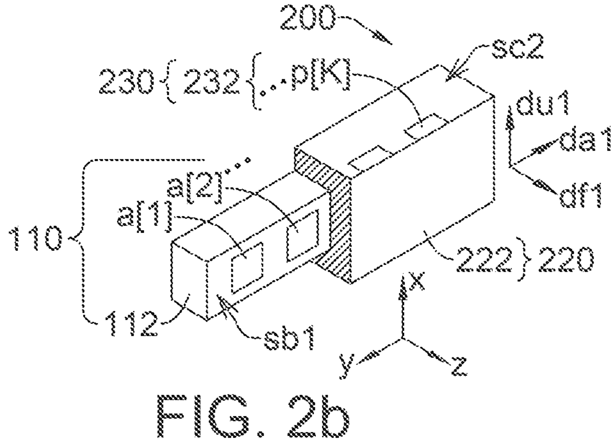
Figure 2C:
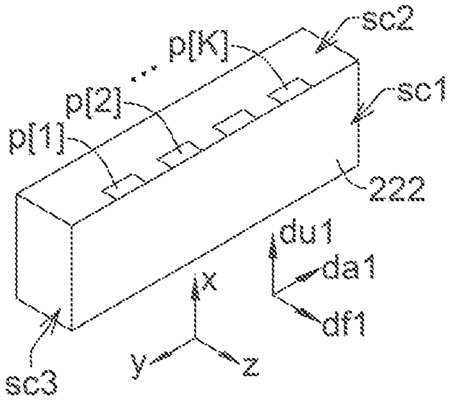
Figure 2D:
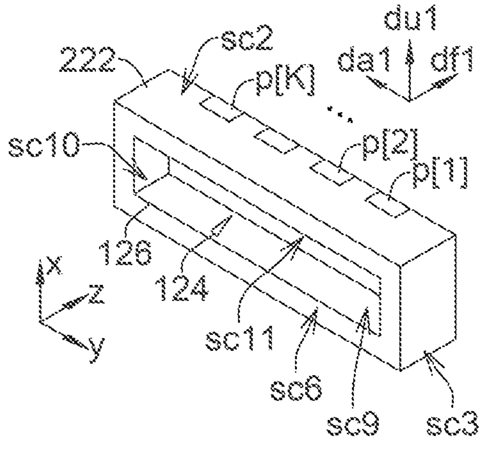
Figure 2E:
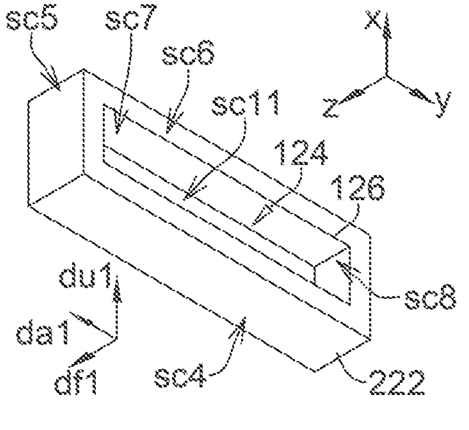
Figure 2F:
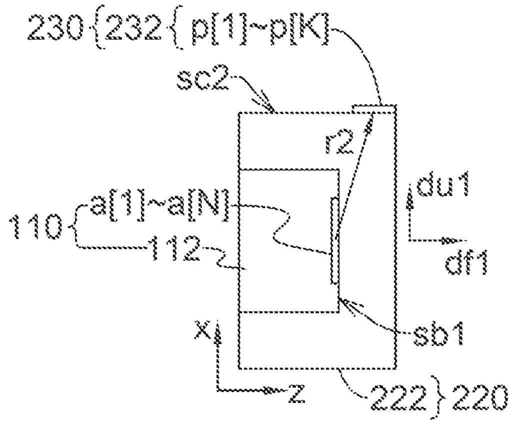
Figure 2G:
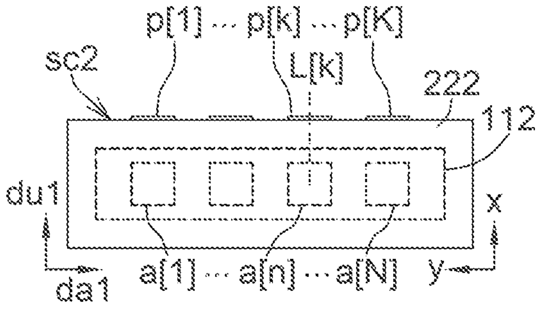

FIG. 2*b* depicts an assembly of the AiM 100, the support structure 220 and the auxiliary structure 230, with a portion of the support structure 220 and the auxiliary structure 230 hidden for clearer visual understanding. FIGS. 2*c*, 2*d* and 2*e* depict the cap 222 and the thin members p[1] to p[K] from different viewpoints (e.g., a top-right-front viewpoint, a top-right-back viewpoint and a bottom-left-back viewpoint respectively). FIG. 2*f* depicts arrangement of the AiM 110, the support structure 220 and the auxiliary structure 230 by a side view (e.g., a view looking along the array direction da1). FIG. 2*g* depicts arrangement of the radiators a[1] to a[N] and the thin members p[1] to p[K] by a front view (e.g., a view looking along a direction opposite to the forward direction df1).

As shown in FIGS. 2*d* and 2*e*, the cap 222 may include an open cavity 124, and may be enclosed by a combination of a plurality of cap outward surfaces; the cap outward surfaces may include a cap front surface sc1, one or more cap side surfaces such as sc2, sc3, sc4 and sc5, a cap rear surface sc6, one or more cavity side surfaces such as sc7, sc8, sc9 and sc10, and a cavity end surface sc11. The cap rear surface sc6 may include a cavity opening 126. The cap side surfaces sc2 to sc5 may extend between a perimeter of the cap front surface sc1 and an outer perimeter of the cap rear surface sc6. The cavity side surfaces sc7 to sc10 may extend from a perimeter of the cavity opening 126 to a perimeter of the cavity end surface sc11.

As shown in FIGS. 2*b* and 2*f*, the AiM 100 may fit into the open cavity 124 of the cap 222, wherein one or more outward surfaces of the AiM 110, such as the front surface sb1 and/or side surface(s) of the base 112, may be attached to the cavity end surface sc11 and/or the cavity side surface(s) sc7 to sc10, respectively.

According to an embodiment of the invention, the thin members p[1] to p[K] in the upper front structure 232 of the auxiliary structure 230 may be disposed on a predetermined surface of the support structure 220, wherein the predetermined surface may be perpendicular to a direction substantially nonparallel (e.g., perpendicular) to the forward direction df1. For example, as shown in FIGS. 2*b* to 2*d*, in an embodiment, the thin members p[1] to p[K] may be placed on the cap side surface sc2 of the cap 222, wherein the cap side surface sc2 may be perpendicular to the upward direction du1 perpendicular to the forward direction df1. In an embodiment, the thin members p[1] to p[K] may be formed on the cap side surface sc2 by laser direct structuring (LDS).

As shown in FIGS. 2*a* to 2*d*, in an embodiment, each of the thin members p[1] to p[K] may be a rectangular planar plate attached to the cap side surface sc2 along an edge of the cap side surface sc2; however, in other embodiments not depicted, each of the thin members p[1] to p[K] may not be rectangular, and/or, may not be planar; for example, each of the thin members p[1] to p[K] may have two nonparallel (e.g., perpendicular) planar portions respectively attached to the cap side surface sc2 and the cap front sc1 (FIG. 2*c*) of the cap 222.

Like the radiator a[1] to a[N] which may linearly distribute along the array direction da1, the thin members p[1] to p[K] may also linearly distribute along the array direction da1 substantially. In an embodiment, distances between every adjacent two of the thin members p[1] to p[K] may be equal. In an embodiment, a position of each thin member p[k] may align a position of an associated radiator a[n] of the radiators a[1] to a[N], for the index variable k being 1 to K and the index variable n being one of 1 to N. For example, in an embodiment, as shown in FIG. 2*g*, on a geometric plane (e.g., the geometric xy-plane) perpendicular to the forward direction df1, a projection of a geometric center of the thin member p[k] and a projection of a geometric center of the associated radiator a[n] may form a geometric vertical line L[k] parallel to the upward direction du1 (e.g., the x-direction). In an embodiment, each thin members p[k] of the thin members p[1] to p[K] may be configured to resonate at a half of a wavelength of frequency band(s) of wireless communication along the array direction da1.

Figure 2H:
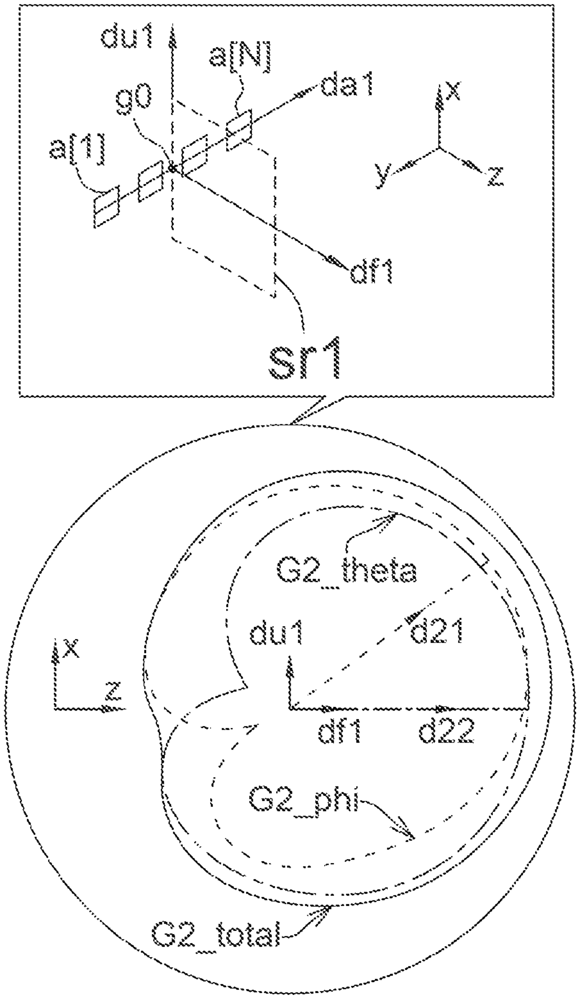
Figure 2I:
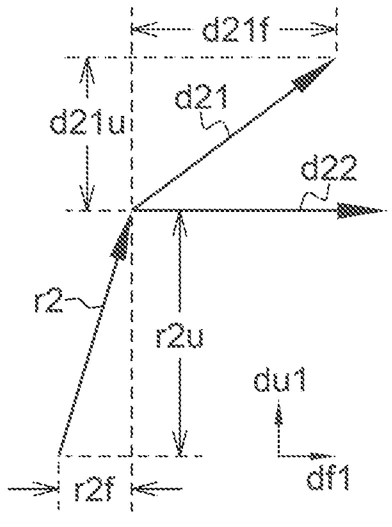

As shown in FIG. 2*f*, on a geometric plane (e.g., a geometric xz-plane) perpendicular to the array direction da1, a position of the upper front structure 232 (e.g., a projection of a geometric center of the thin members p[1] to p[K]) may be away from a position of the radiators a[1] to a[N] (e.g., a projection of a geometric center of the radiators a[1] to a[N]) along a direction r2; in an embodiment, the direction r2 may be an upward-forward direction. Referring to FIG. 2*i* which reproduces the direction r2, the direction r2 may be represented by a vector having a positive vector component r2*u* along the upward direction du1 and a positive vector component r2*f* along the forward direction df1.

According to the invention, the thin members p[1] to p[K] in the upper front structure 232 of the auxiliary structure 230 may be arranged to be an electromagnetic director for radiation pattern of the first component of gain at one or more frequency bands of wireless communication. FIG. 2*h* depicts an example of radiation patterns of the antenna subsystem 200 on a geometric plane sr1 at a frequency band of wireless communication, wherein the geometric plane sr1 may be perpendicular to the array direction da1, may be parallel to the geometric xz-plane, and may include a geometric center g0 of the radiators a[1] to a[N] as a geometric origin. As shown in FIG. 2*h*, a radiation pattern G2_theta of the second component of gain may point to a direction d22 (e.g., may maximize at the direction d22), and the thin members p[1] to p[K] in the upper front structure 232 of the auxiliary structure 230 may orient a radiation pattern G2_phi of the first component of gain to a direction d21 (e.g., may cause the radiation pattern G2_phi to maximize at the direction d21), wherein the directions d21 and d22 may be different. For example, the direction d22 may point along (or nearly along) the forward direction df1, and the direction d21 may be an upward-forward direction; as shown in FIG. 2*i* which also reproduces the directions d21 and d22 besides the direction r2, the direction d22 may be substantially or nearly parallel to the forward direction df1, and the direction d21 may be represented by a vector having a positive vector component d21*u* along the upward direction du1 and a positive vector component d21*f* along the forward direction df1.

With the thin members p[1] to p[K] in the upper front structure 232 of the auxiliary structure 230 deviating the directions d21 and d22 of the radiation patterns G2_phi and G2_theta of the first and second components of gain, an overall radiation pattern G2_total (FIG. 2*h*) resulting from a combination of the first component of gain and the second component of gain may therefore expand at the frequency band of wireless communication. In other words, comparing to overall radiation pattern and spherical coverage provided by the AiM 110 alone, overall radiation pattern and spherical coverage provided by the antenna subsystem 200 which accompanies the AiM 110 with the auxiliary structure 230 may be broader and better at frequency band(s) of wireless communication.

In an embodiment, the AiM 110, the support structure 220 and the auxiliary structure 230 in the antenna subsystem 200 may be integrating into a mechanical part by fitting the AiM 100 into the cap 222 and disposing the thin members p[1] to p[K] on the surface sc2 of the cap 222; such integration may ease deployment of the antenna subsystem 200, and may lower time and cost of implementing wireless communication functionality for a UE (e.g., the UE 10 in FIG. 1*a*).

Figure 3A:
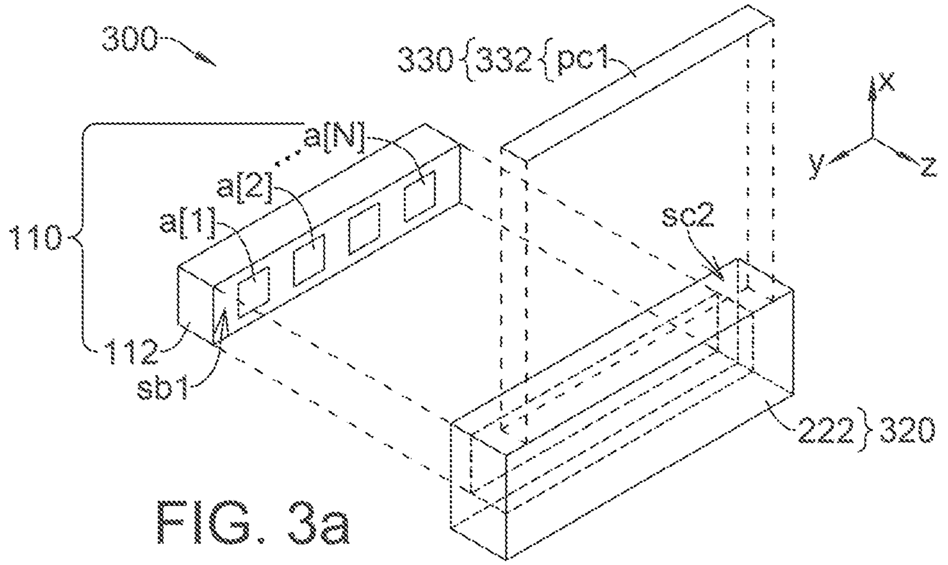
FIGS. 3*a* to 3*i* illustrate various aspects of an antenna subsystem according to an embodiment of the invention.

FIGS. 3*a* to 3*i* illustrate various aspects of an antenna subsystem 300 according to an embodiment of the invention. FIG. 3*a* depicts an exploded view of the antenna subsystem 300; the antenna subsystem 300 may include the AiM 110, a support structure 320 and an auxiliary structure 330. The antenna subsystem 300 may implement the antenna subsystem 100 shown in FIG. 1*a*, wherein the support structure 320 and the auxiliary structure 330 may implement the support structure 120 and the auxiliary structure 130, respectively. As shown in FIG. 3*a*, the support structure 320 may include the cap 222 (previously described by referring to FIGS. 2*b* to 2*f*), the auxiliary structure 330 may include an upper front structure 332, and the upper front structure 332 may include a long thin member pc1. The long thin member pc1 may be conductive, and may be insulated from the radiators a[1] to a[N] disposed on the front surface sb1 of the base 112.

Figure 3B:
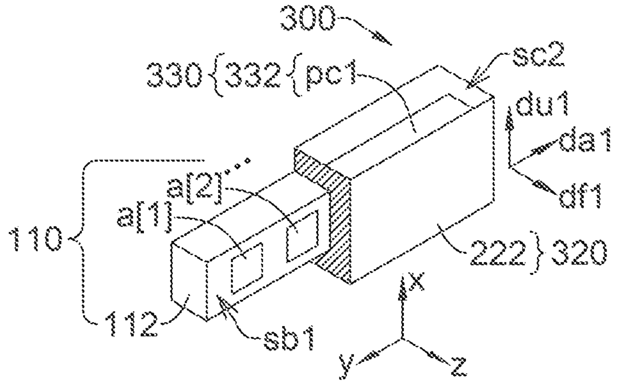
Figure 3C:
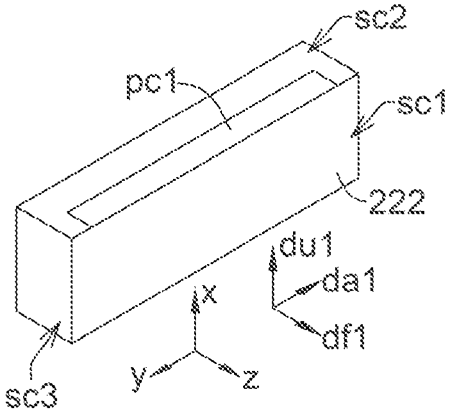
Figure 3D:
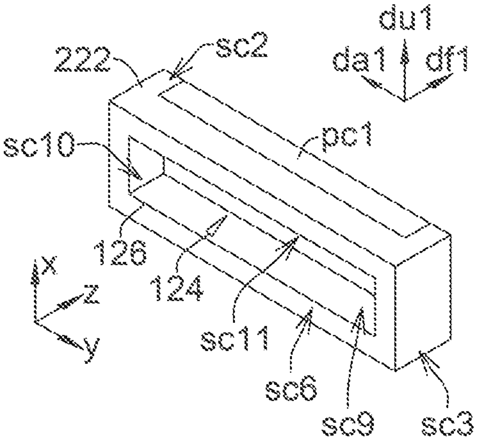
Figure 3E:
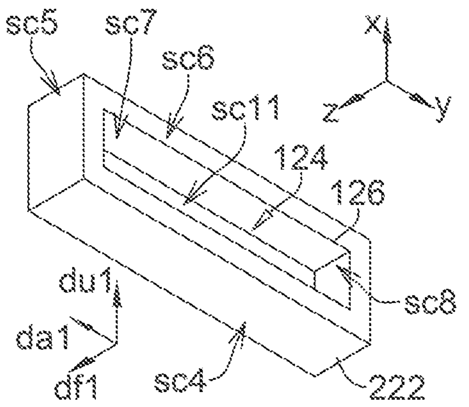
Figure 3F:
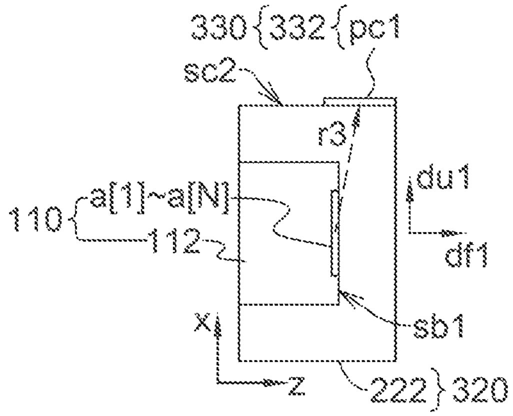
Figure 3G:
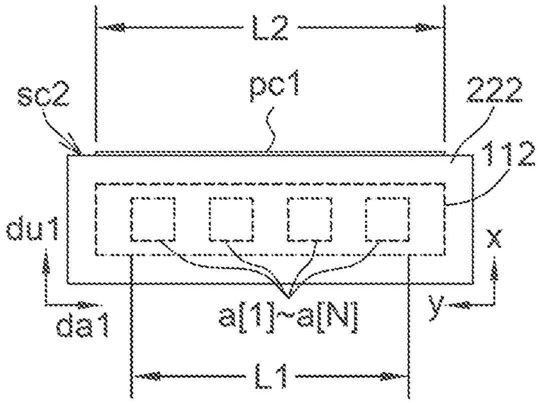

FIG. 3*b* depicts an assembly of the AiM 100, the support structure 320 and the auxiliary structure 330, with a portion of the support structure 320 and the auxiliary structure 330 hidden for clearer visual understanding. FIGS. 3*c*, 3*d* and 3*e* depict the cap 222 and the long thin member pc1 from different viewpoints (e.g., a top-right-front viewpoint, a top-right-back viewpoint and a bottom-left-back viewpoint respectively). FIG. 3*f* depicts arrangement of the AiM 110, the support structure 320 and the auxiliary structure 330 by a side view (e.g., a view looking along the array direction da1). FIG. 3*g* depicts arrangement of the radiators a[1] to a[N] and the long thin member pc1 by a front view (e.g., a view looking along a direction opposite to the forward direction df1).

According to an embodiment of the invention, the long thin member pc1 in the upper front structure 332 of the auxiliary structure 330 may be disposed on a predetermined surface of the support structure 320, wherein the predetermined surface may be perpendicular to a direction substantially nonparallel (e.g., perpendicular) to the forward direction df1. For example, as shown in FIGS. 3*b* to 3*d*, in an embodiment, the long thin member pc1 may be disposed on the cap side surface sc2 of the cap 222. In an embodiment, the long thin member pc1 may be formed on the cap side surface sc2 by LDS.

Figure 3H:
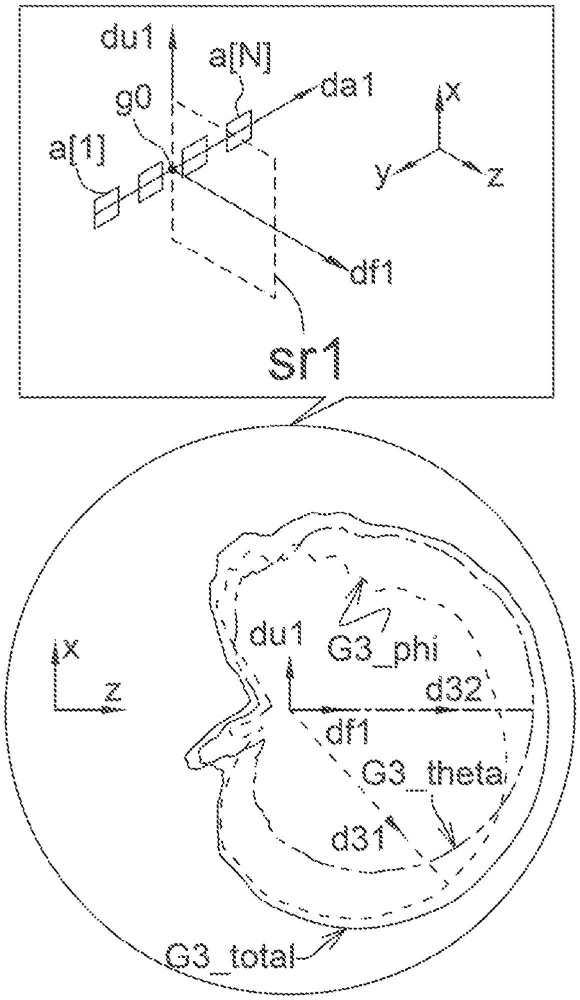
Figure 3I:
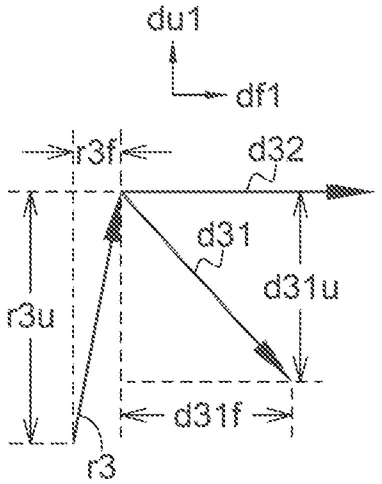

As shown in FIGS. 3*a* to 3*d*, in an embodiment, the long thin member pc1 may be a rectangular planar plate attached to the cap side surface sc2 along an edge of the cap side surface sc2; however, in other embodiments not depicted, the long thin member pc1 may not be rectangular. As shown in FIG. 3*g*, the radiator a[1] to a[N] may linearly distribute along the array direction da1 over a length L1, the long thin member pc1 may substantially extend along the array direction da1 by a length L2, and the length L2 may be longer than or equal to the length L1. As shown in FIG. 3*f*, on a geometric plane (e.g., the geometric xz-plane) perpendicular to the array direction da1, a position of the upper front structure 332 in the auxiliary structure 330 (e.g., a projection of a geometric center of the long thin member pc1) may be away from the position of the radiators a[1] to a[N] (e.g., the projection of a geometric center of the radiators a[1] to a[N]) along a direction r3; in an embodiment, the direction r3 may an upward-forward direction r3. Referring to FIG. 3*i* which reproduces the direction r3, the direction r3 may be represented by a vector having a positive vector component r3*u* along the upward direction du1 and a positive vector component r3*f* along the forward direction df1.

According to the invention, the long thin member pc1 in the upper front structure 332 of the auxiliary structure 330 may be arranged to be an electromagnetic reflector for radiation pattern of the first component of gain at one or more frequency bands of wireless communication. FIG. 3*h* depicts an example of radiation patterns of the antenna subsystem 300 on the geometric plane sr1 at a frequency band of wireless communication, wherein the geometric plane sr1 may be perpendicular to the array direction da1, and may include a geometric center g0 of the radiators a[1] to a[N] as a geometric origin. As shown in FIG. 3*h*, a radiation pattern G3_theta of the second component of gain may point to a direction d32 (e.g., may maximize at the direction d32), and the long thin member pc1 in the upper front structure 332 of the auxiliary structure 330 may orient a radiation pattern G3_phi of the first component of gain to a direction d31 (e.g., may cause the radiation pattern G3_phi to maximize at the direction d31), wherein the directions d31 and d32 may be different. For example, the direction d32 may point along (or nearly along) the forward direction df1, and the direction d31 may be a downward-forward direction; as shown in FIG. 3*i* which also reproduces the directions d31 and d32 besides the direction r3, the direction d32 may be substantially or nearly parallel to the forward direction df1, and the direction d31 may be represented by a vector having a negative vector component d31*u* along the upward direction du1 and a positive vector component d31*f* along the forward direction df1.

With the long thin member pc1 in the upper front structure 332 of the auxiliary structure 330 deviating the directions d31 and d32 of the radiation patterns G3_phi and G3_theta of the first and second components of gain, an overall radiation pattern G3_total (FIG. 3*h*) resulting from a combination of the first component of gain and the second component of gain may therefore expand at the frequency band of wireless communication. In other words, comparing to overall radiation pattern and spherical coverage provided by the AiM 110 alone, overall radiation pattern and spherical coverage provided by the antenna subsystem 300 which accompanies the AiM 110 with the auxiliary structure 330 may be broader and better at frequency band(s) of wireless communication.

In an embodiment, the AiM 110, the support structure 320 and the auxiliary structure 330 in the antenna subsystem 200 may be integrating into a mechanical part by fitting the AiM 100 into the cap 222 and disposing the long thin member pc1 on the surface sc2 of the cap 222; such integration may ease deployment of the antenna subsystem 300, and may lower time and cost of implementing wireless communication functionality for a UE (e.g., the UE 10 in FIG. 1*a*).

Figure 4A:
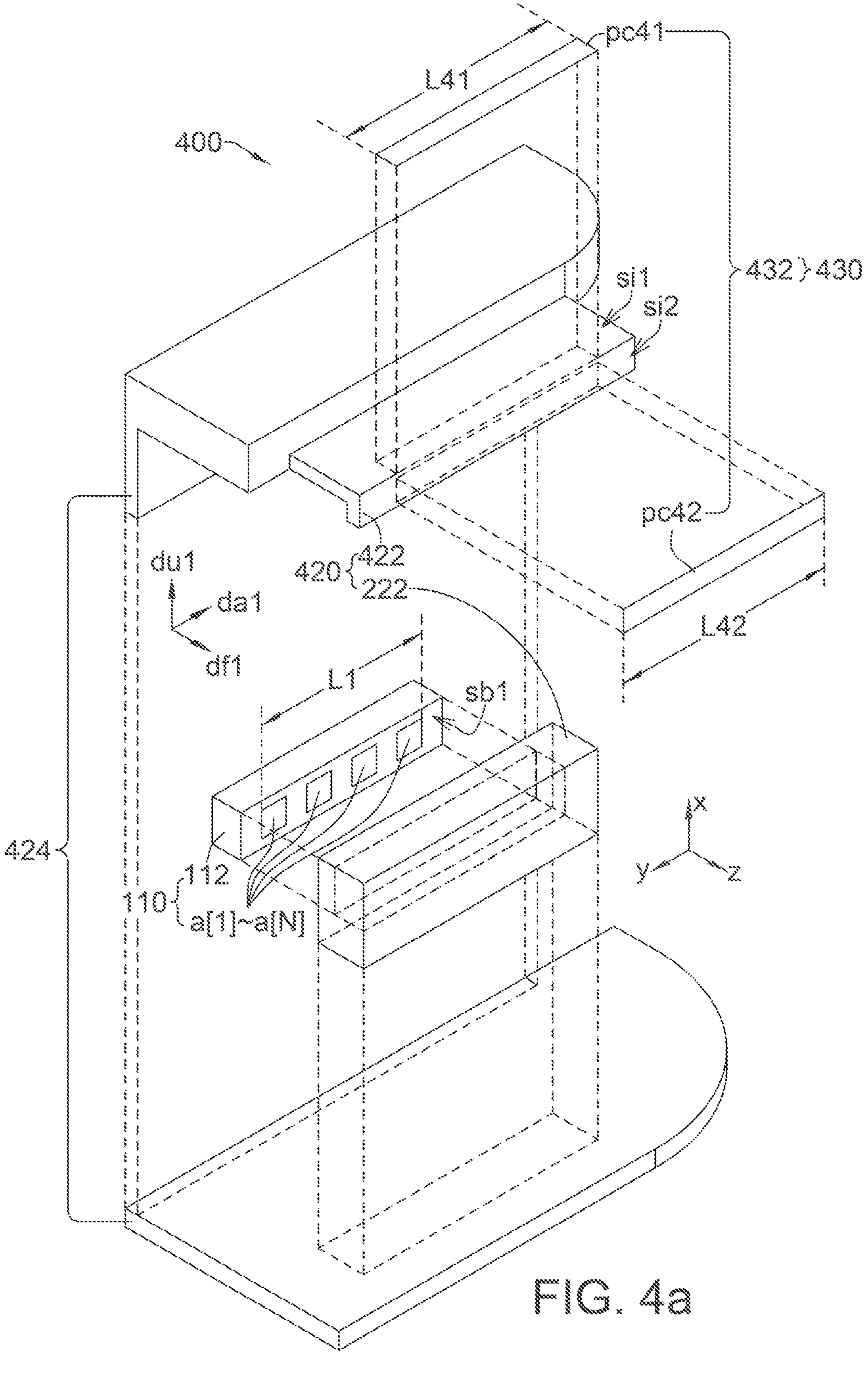
FIGS. 4*a* to 4*f* illustrate various aspects of an antenna subsystem according to an embodiment of the invention.

FIGS. 4*a* to 4*f* illustrate various aspects of an antenna subsystem 400 according to an embodiment of the invention. FIG. 4*a* depicts an exploded view of the antenna subsystem 400; the antenna subsystem 400 may include the AiM 110, a support structure 420 and an auxiliary structure 430. The antenna subsystem 400 may implement the antenna subsystem 100 shown in FIG. 1*a*, wherein the support structure 420 and the auxiliary structure 430 may implement the support structure 120 and the auxiliary structure 130, respectively. As shown in FIG. 4*a*, the support structure 420 may include the cap 222 and an accessory portion 422, the auxiliary structure 430 may include an upper front structure 432, and the upper front structure 432 may include two long thin members pc41 and pc42. The accessory portion 422 may be a nonconductive (dielectric) portion of an interior structure 424, and the interior structure 424 may be, e.g., a middle frame, of the UE 10 (FIG. 1*c*). Each of the long thin members pc41 and pc42 may be conductive; the two long thin members pc41 and pc42 may be mutually insulated, and may be insulated from the radiators a[1] to a[N].

Figure 4B:
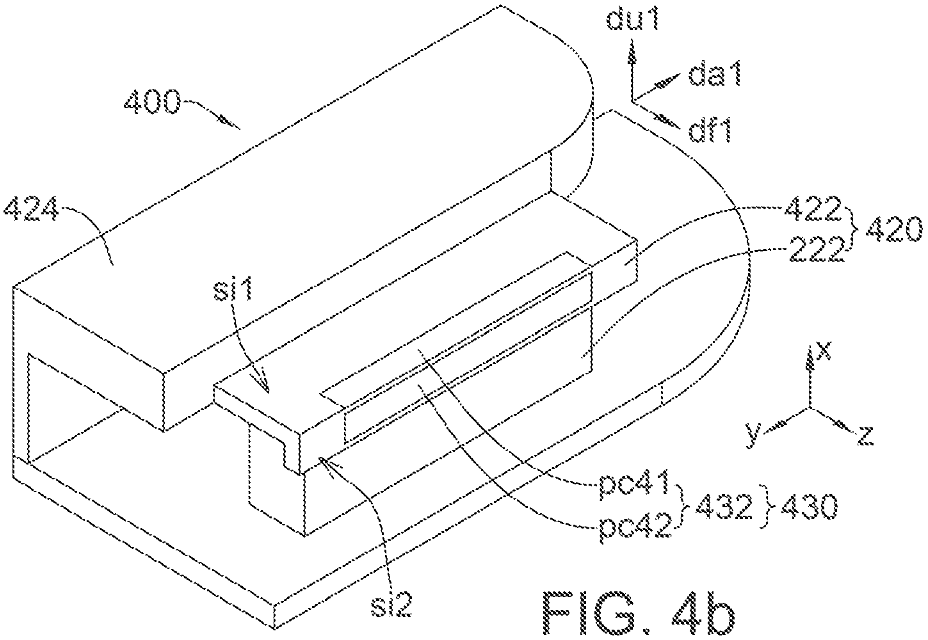
Figure 4C:
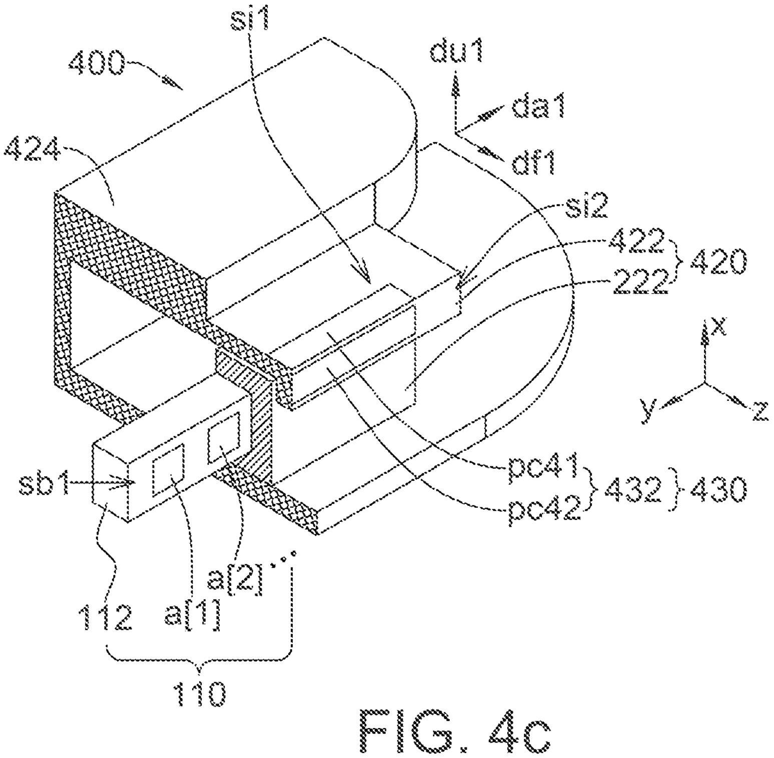

FIG. 4*b* depicts an assembly of the support structure 420 and the auxiliary structure 430, and FIG. 4*c* depicts the same assembly with a portion of the support structure 420 and the auxiliary structure 430 hidden to demonstrate the AiM 110 fit in the cap 222. As shown in FIGS. 4*a* to 4*c*, in an embodiment, the long thin member pc41 may be disposed on a surface si1 of the accessory portion 422 in the support structure 420, and the long thin member pc42 may be disposed on another surface si2 of the accessory portion 422, wherein the surfaces si1 and si2 may be two substantially nonparallel surfaces (e.g., two substantially perpendicular surfaces) respectively perpendicular to two substantially nonparallel directions (e.g., two substantially perpendicular directions); for example, the surface si1 may be perpendicular to the upward direction du1 (e.g., the x-direction), and the surface si2 may be perpendicular to the forward direction df1 (e.g., the z-direction). In an embodiment, the long thin members pc41 and pc42 may be disposed near an intersection edge of the surfaces si1 and si2, but may remain physically separated to be mutually insulated. As shown in FIG. 4*a*, the radiators a[1] to a[N] may distribute along the array direction da1 over the length L1, the long thin member pc41 may extend substantially along the array direction da1 by a length L41, and the long thin member pc42 may extend substantially along the array direction da1 by a length L42. In an embodiment, one or two of the lengths L41 and L42 may be longer than or equal to the length L1. In an embodiment, the long thin members pc41 and pc42 may be formed on the surface si1 and si2 by LDS, respectively.

Figure 4D:
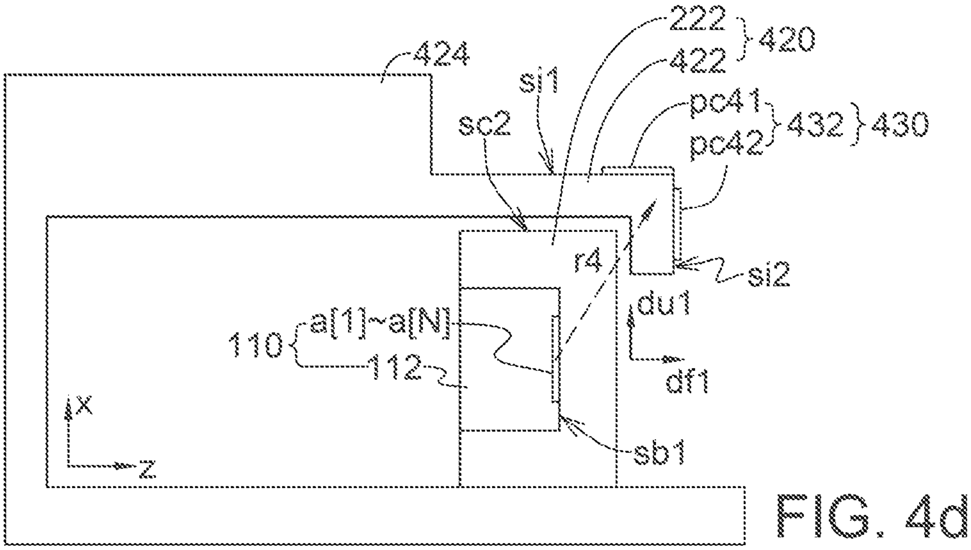
Figure 4E:
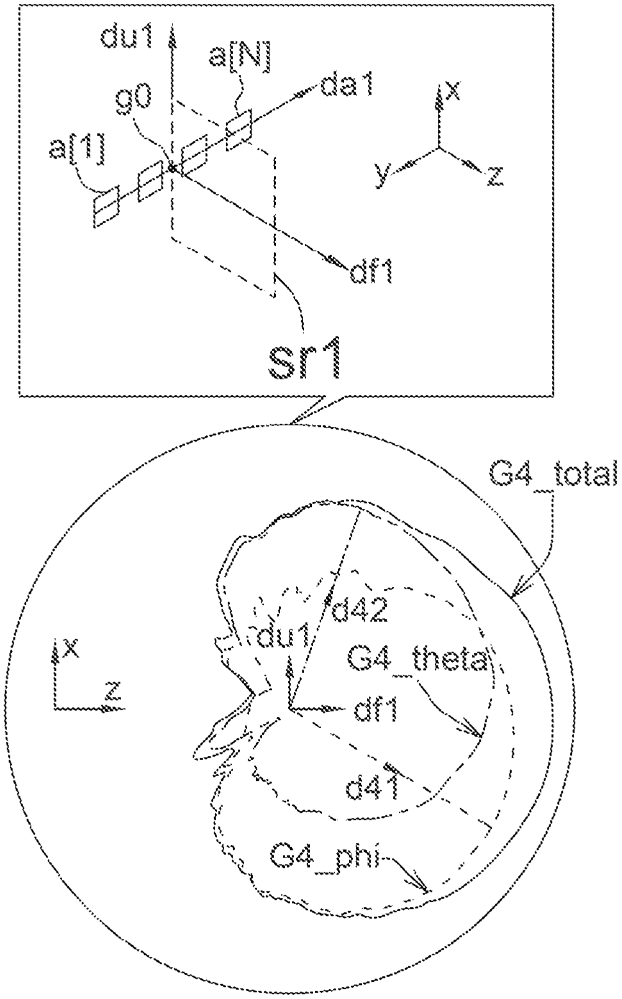
Figure 4F:
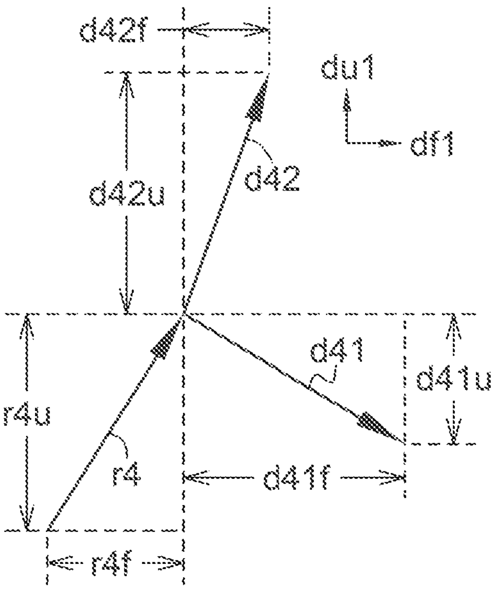

FIG. 4*d* depicts arrangement of the AiM 110, the support structure 420 and the auxiliary structure 430 by a side view (e.g., a view looking along the array direction da1). As shown in FIG. 4*d*, on a geometric plane (e.g., the geometric xz-plane) perpendicular to the array direction da1, a position of the upper front structure 432 in the auxiliary structure 430 (e.g., a projection of a geometric center of the long thin members pc41 and pc42) may be away from the position of the radiators a[1] to a[N] (e.g., the projection of a geometric center of the radiators a[1] to a[N]) along a direction r4; in an embodiment, the direction r4 may be an upward-forward direction. Referring to FIG. 4*f* which reproduces the direction r4, the direction r4 may be represented by a vector having a positive vector component r4*u* along the upward direction du1 and a positive vector component r4*f* along the forward direction df1.

According to the invention, the long thin members pc41 and pc42 in the upper front structure 432 of the auxiliary structure 430 may be arranged to be an electromagnetic reflector for radiation pattern of the first component of gain, and also be an electromagnetic director for radiation pattern of the second component of gain, at one or more frequency bands of wireless communication. FIG. 4*e* depicts an example of radiation patterns of the antenna subsystem 400 on the geometric plane sr1 at a frequency band of wireless communication, wherein the geometric plane sr1 may be perpendicular to the array direction da1, and may include a geometric center g0 of the radiators a[1] to a[N] as a geometric origin. As shown in FIG. 4*e*, the long thin members pc41 and pc42 in the upper front structure 432 of the auxiliary structure 430 may orient a radiation pattern G4_theta of the second component of gain to a direction d42 (e.g., may cause the radiation pattern G4_theta to maximize at the direction d42), and may also orient a radiation pattern G4_phi of the first component of gain to a direction d41 (e.g., may cause the radiation pattern G2_phi to maximize at the direction d41), wherein the directions d41 and d42 may be different, e.g., be nonparallel. For example, the direction d41 may be a downward-forward direction, and the direction d42 may be an upward-forward direction; as shown in FIG. 4*f* which also reproduces the directions d41 and d42 besides the direction r4, the direction d41 may be represented by a vector having a negative vector component d41*u* along the upward direction du1 and a positive vector component d41*f* along the forward direction df1, and the direction d42 may be represented by a vector having a positive vector component d42*u* along the upward direction du1 and a positive vector component d42*f* along the forward direction df1. With the long thin members pc41 and pc42 in the upper front structure 432 of the auxiliary structure 430 deviating the directions d41 and d42 of the radiation patterns G4_phi and G4_theta of the first and second components of gain, an overall radiation pattern G4_total (FIG. 4*e*) resulting from a combination of the first component of gain and the second component of gain may therefore expand at the frequency band of wireless communication. In other words, comparing to overall radiation pattern and spherical coverage provided by the AiM 110 alone, overall radiation pattern and spherical coverage provided by the antenna subsystem 400 which accompanies the AiM 110 with the auxiliary structure 430 may be broader and better at frequency band(s) of wireless communication.

According to the invention, at frequency band(s) of wireless communication, the long thin members pc41 and pc42 in the upper front structure 432 of the auxiliary structure 430 may be a magnetic current antenna which may result in magnetic current resonance along the array direction da1. As magnetic current may contribute to electrical field of an orthogonal direction, the magnetic current along the array direction da1 may contribute to electrical field along the forward direction df1, and the upper front structure 432 may therefore be an electromagnetic director for the radiation pattern of the second component of gain.

Figure 5A:
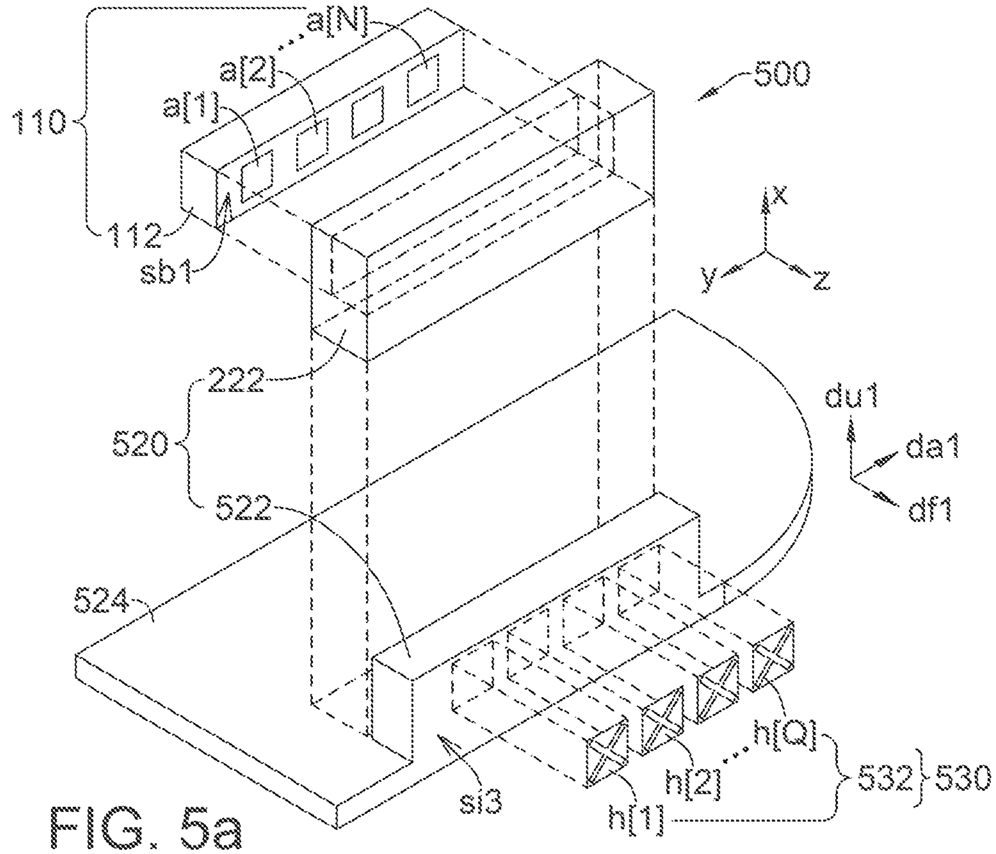
FIGS. 5*a* to 5*g* illustrate various aspects of an antenna subsystem according to an embodiment of the invention.

FIGS. 5*a* to 5*g* illustrate various aspects of an antenna subsystem 500 according to an embodiment of the invention. FIG. 5*a* depicts an exploded view of the antenna subsystem 500; the antenna subsystem 500 may include the AiM 110, a support structure 520 and an auxiliary structure 530. The antenna subsystem 500 may implement the antenna subsystem 100 shown in FIG. 1*a*, wherein the support structure 520 and the auxiliary structure 530 may implement the support structure 120 and the auxiliary structure 130, respectively. As shown in FIG. 5*a*, the support structure 520 may include the cap 222 and an accessory portion 522, the auxiliary structure 530 may include a forepart structure 532, and the forepart structure 532 may include one or more thin units h[1] to h[Q], wherein the index Q may be an integer constant greater than or equal to one. As the AiM 100 may include the radiators a[1] to a[N], in an embodiment, the index Q may equal the index N. Each of the thin units h[1] to h[Q] may be conductive; the thin units h[1] to h[Q] may be mutually insulated, and may be insulated from the radiators a[1] to a[N]. The accessory portion 522 may be a nonconductive (dielectric) portion of an interior structure 524 (e.g., a middle frame) of the UE 10 (FIG. 1*c*).

Figure 5B:
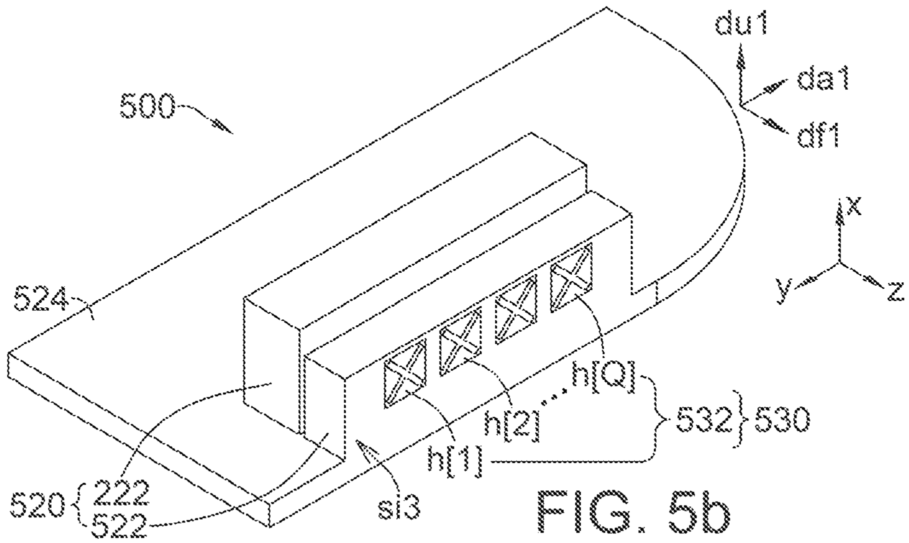
Figure 5C:
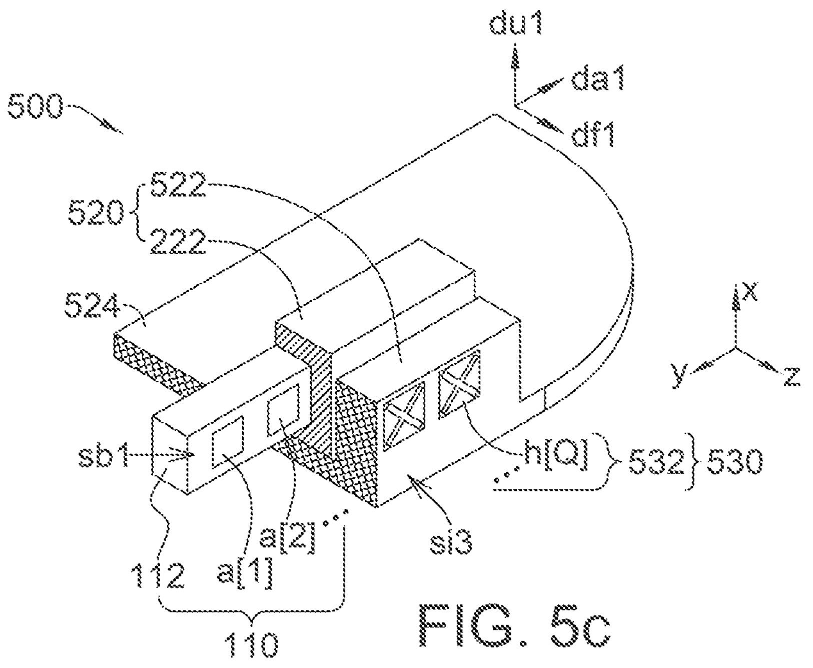

FIG. 5*b* depicts an assembly of the support structure 520 and the auxiliary structure 530, and FIG. 5*c* depicts the same assembly with a portion of the support structure 520 and the auxiliary structure 530 hidden to demonstrate the AiM 110 fit in the cap 222. Referring to FIGS. 5*a* to 5*c*, as the radiator a[1] to a[N] may be disposed on the front surface sb1 of the base 110, the thin units h[1] to h[Q] may be disposed on a surface si3 of the accessory portion 522 in the support structure 520, wherein the surface si3 may be substantially parallel to the front surface 122. As the radiators a[1] to a[N] may distribute along the array direction da1, the thin units h[1] to h[Q] may also distribute along the array direction da1. In an embodiment, the thin units h[1] to h[Q] may be formed on the surface si3 by LDS.

Figure 5D:
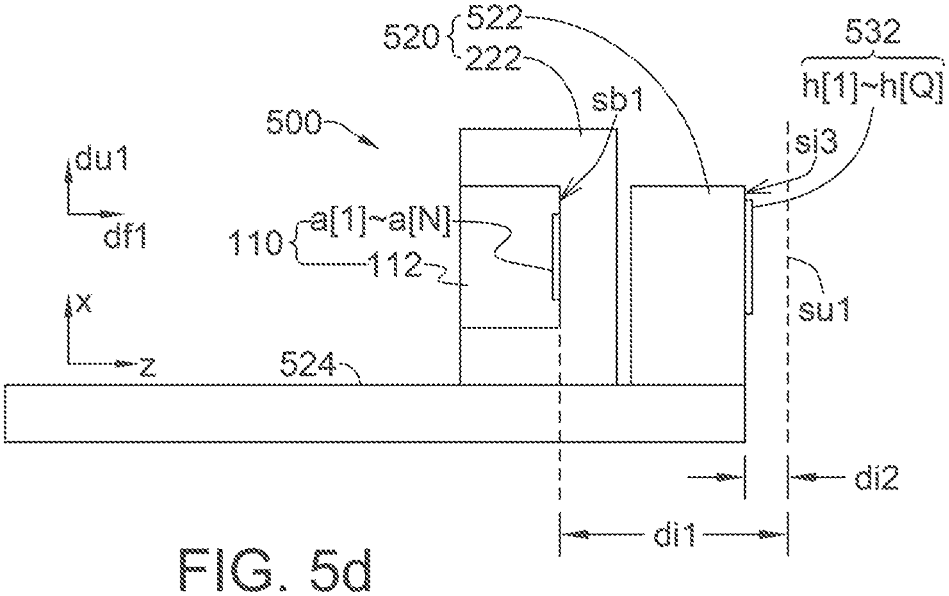

FIG. 5*d* depicts arrangement of the AiM 110, the support structure 520 and the auxiliary structure 530 by a side view (e.g., a view looking along the array direction da1). As the antenna subsystem 500 may implement the subsystem 100 (FIG. 1*c*) to be enclosed by the external surface su1 of the UE 10, along the forward direction df1, a distance di2 between the surface si3 and the external surface su1 may be shorter than a distance di1 between the front surface sb1 and the external surface su1. In other words, comparing to the radiators a[1] to a[N] in the AiM 110, the thin units h[1] to h[Q] in the forepart structure 532 of the auxiliary structure 530 may be closer to the external surface su1; the thin units h[1] to h[Q] may therefore bring radiation of the radiators a[1] to a[N] closer to the external surface su1 to improve radiation performance(s).

Figure 5E:
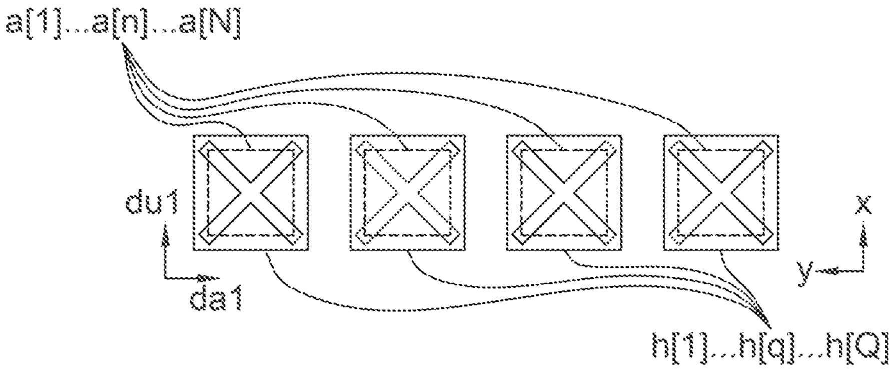
Figure 5F:
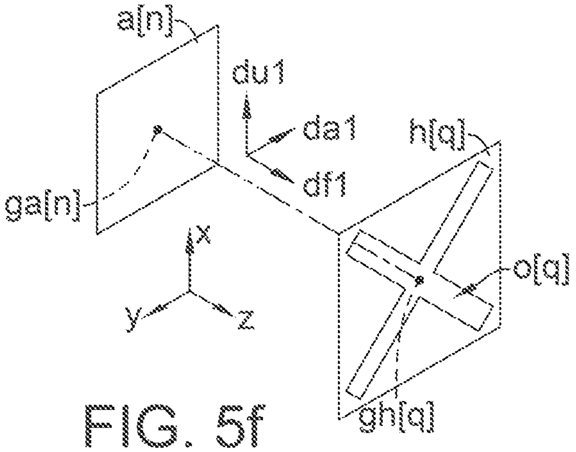

FIG. 5*e* depicts arrangement of the radiators a[1] to a[N] and the thin units h[1] to h[Q] by a front view (e.g., a view looking along a direction opposite to the forward direction df1). As shown in FIG. 5*e*, each thin unit h[q] may be associated with one radiator a[n] of the radiators a[1] to a[N], for the index variable q being 1 to Q and the index variable n being one of 1 to N. FIG. 5*f* depicts arrangement of the thin unit h[q] and the associated radiator a[n] by a three-dimensional view. In an embodiment as shown in FIG. 5*e*, on a geometric plane (e.g., the geometric xy-plane) perpendicular to the forward direction df1, a projection of a position of the thin unit h[q] may align a projection of a position of the associated radiator a[n]; e.g., a projection of a geometric center of the thin unit h[q] may substantially coincide with a projection of a geometric center of the radiator a[n]; in other words, as shown in FIG. 5*f*, a geometric center gh[q] of the thin unit h[q] and a geometric center ga[n] of the associated radiator a[n] may form a geometric line parallel to the forward direction df1. In another embodiment not depicted, on the geometric plane (e.g., the geometric xy-plane) perpendicular to the forward direction df1, the projection of the geometric center of the thin unit h[q] and the projection of the geometric center of the radiator a[n] may form a geometric vertical line along the upward direction du1.

As shown in FIG. 5*f*, in an embodiment, each thin unit h[q] may be a rectangular planar plate including an opening o[q], for example, the opening o[q] may shape like two diagonally crossed slots, wherein sizes of each slot may be configured to support resonance of a half of the wavelength of the frequency band(s) of wireless communication, e.g., a length of each slot may approximate a half of the wavelength. In another embodiment not depicted, each thin unit h[q] may not be rectangular.

According to the invention, at frequency band(s) of wireless communication, the one or more thin units h[1] to h[Q] in the forepart structure 532 of the auxiliary structure 530 may be arranged to be one or more parasitic antennas resonating with the radiators a[1] to a[N], and may be arranged to thereby cause a spherical coverage provided by the antenna subsystem 500 to be broader than the spherical coverage provided by the AiM 110 alone.

Figure 5G:
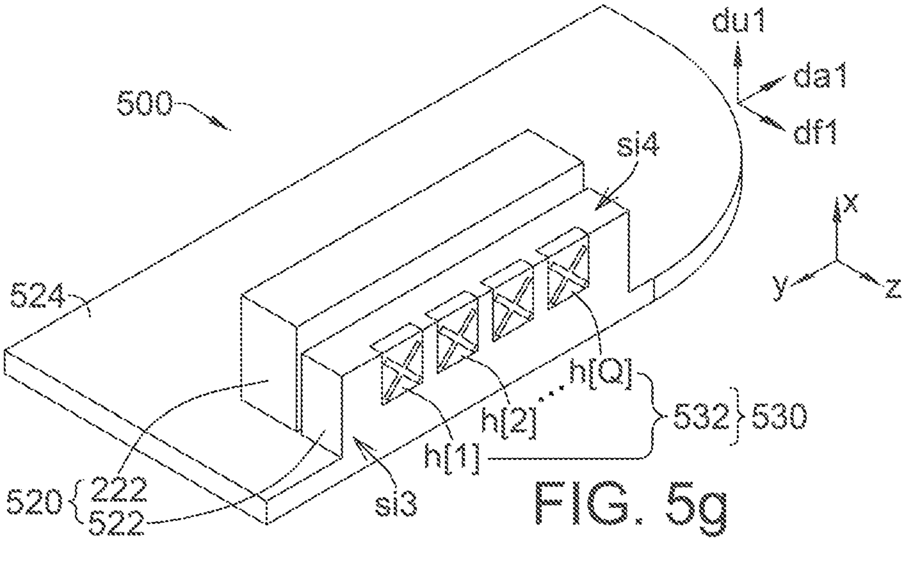

FIG. 5*g* depicts the thin units h[1] to h[Q] according to still another embodiment of the invention; as shown in FIG. 5*g*, each of the thin members p[1] to p[K] may have two nonparallel (e.g., perpendicular) planar portions respectively attached to the surface si3 of the accessory portion 522 and another nonparallel (e.g., perpendicular) surface si4 of the accessory portion 522; for example, the surface si4 may be a surface perpendicular to the upward direction du1.

Figure 6A:
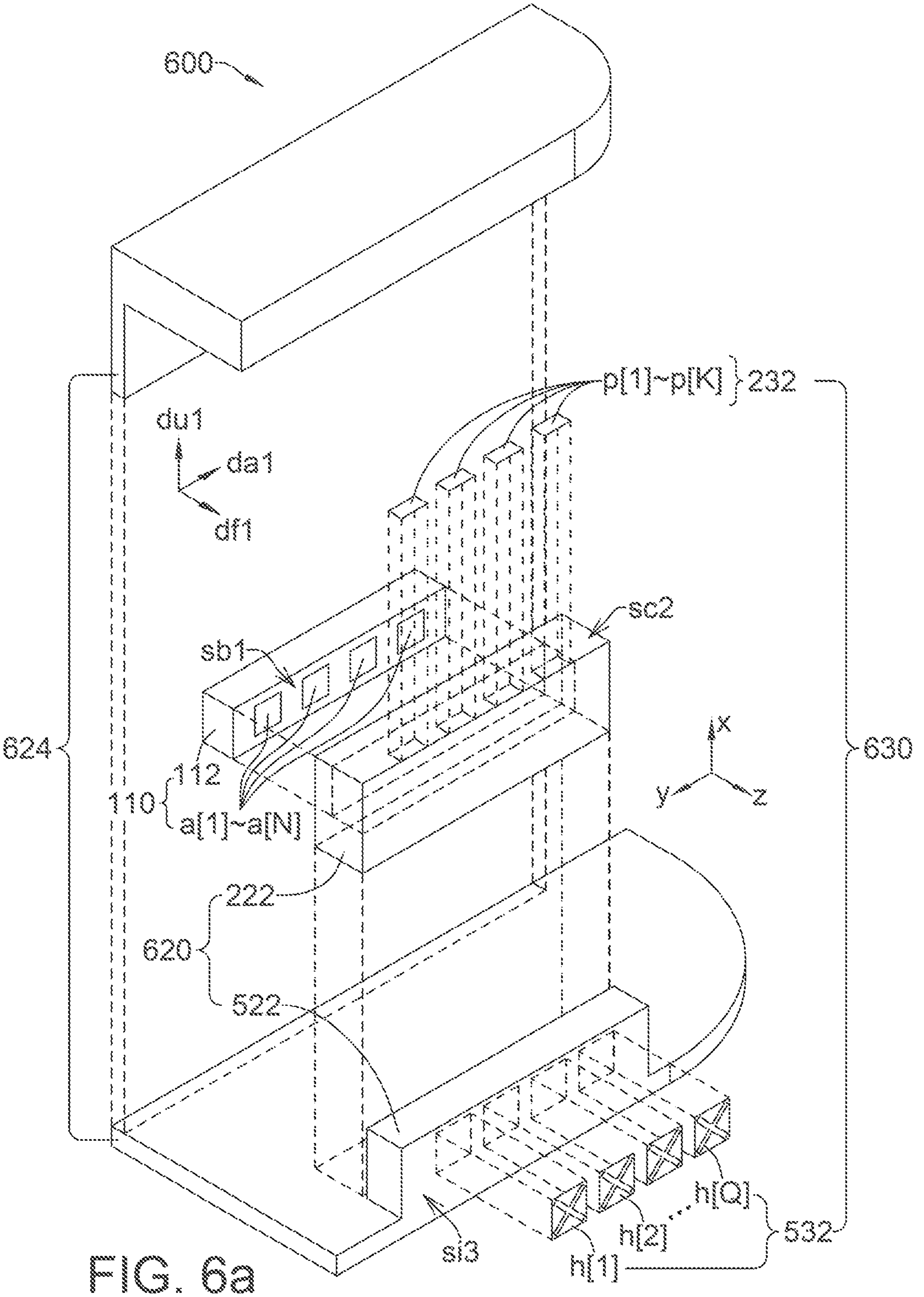
FIGS. 6*a* to 6*f* illustrate various aspects of an antenna subsystem according to an embodiment of the invention.

FIGS. 6*a* to 6*f* illustrate various aspects of an antenna subsystem 600 according to an embodiment of the invention. FIG. 6*a* depicts an exploded view of the antenna subsystem 600; the antenna subsystem 600 may include the AiM 110, a support structure 620 and an auxiliary structure 630. The antenna subsystem 600 may implement the antenna subsystem 100 shown in FIG. 1*a*, wherein the support structure 620 and the auxiliary structure 630 may implement the support structure 120 and the auxiliary structure 130, respectively. As shown in FIG. 6*a*, the support structure 620 may include the cap 222 and the accessory portion 522 (previously described by referring to FIG. 5*a* to 5*d*), and the auxiliary structure 630 may include the upper front structure 232 (previously described by referring to FIGS. 2*a* to 2*g*) and the forepart structure 532 (previously described by referring to FIGS. 5*a* to 5*g*). The accessory portion 522 may be a nonconductive (dielectric) portion of an interior structure 624 (e.g., a middle frame) of the UE 10 (FIG. 1*c*). The upper front structure 232 may include the one or more thin members p[1] to p[K] disposed on the cap side surface sc2 of the cap 222, and the forepart structure 532 may include the one or more thin units h[1] to h[Q] disposed on the surface si3 of the accessory portion 522. Each of the thin members p[1] to p[K], each of the thin units h[1] to h[Q] and each of the radiators a[1] to a[N] may be mutually insulated.

Figure 6B:
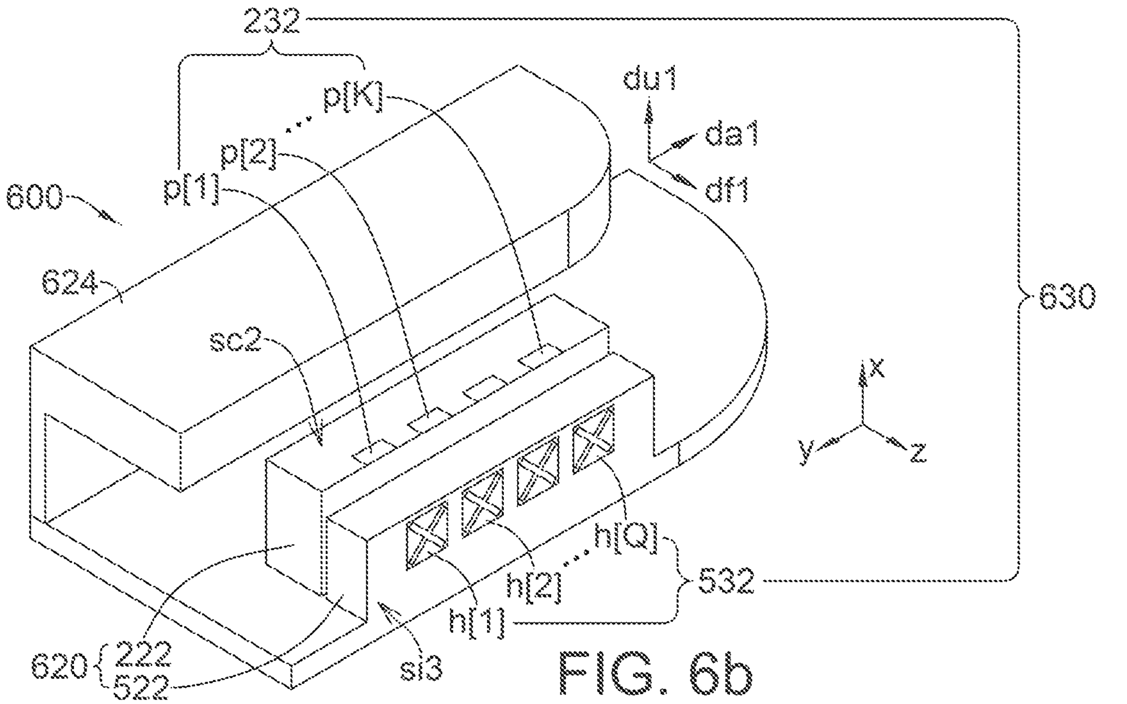
Figure 6C:
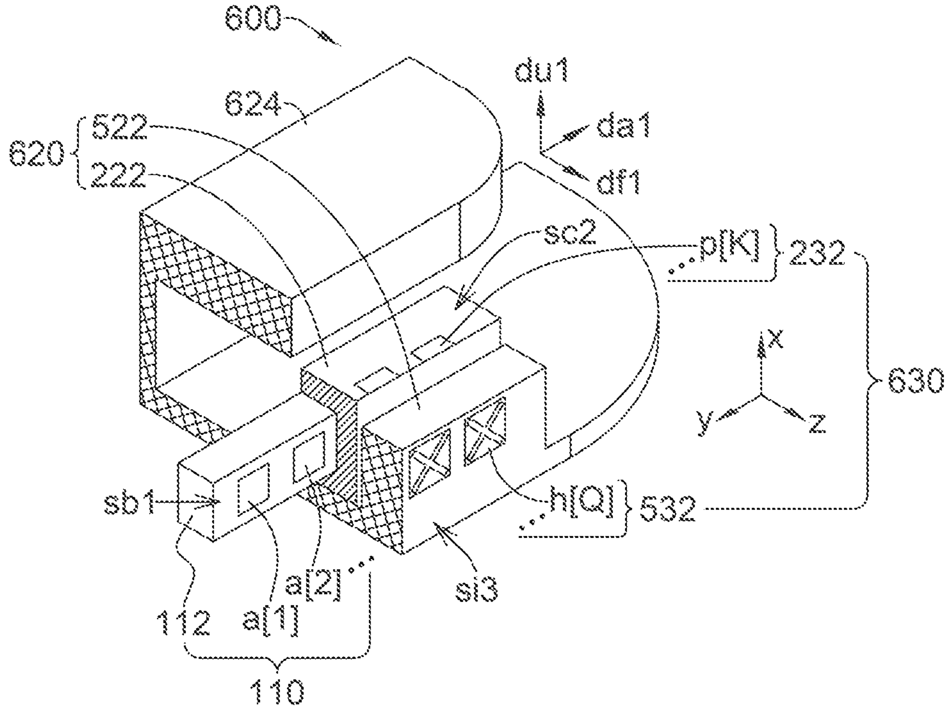
Figure 6D:
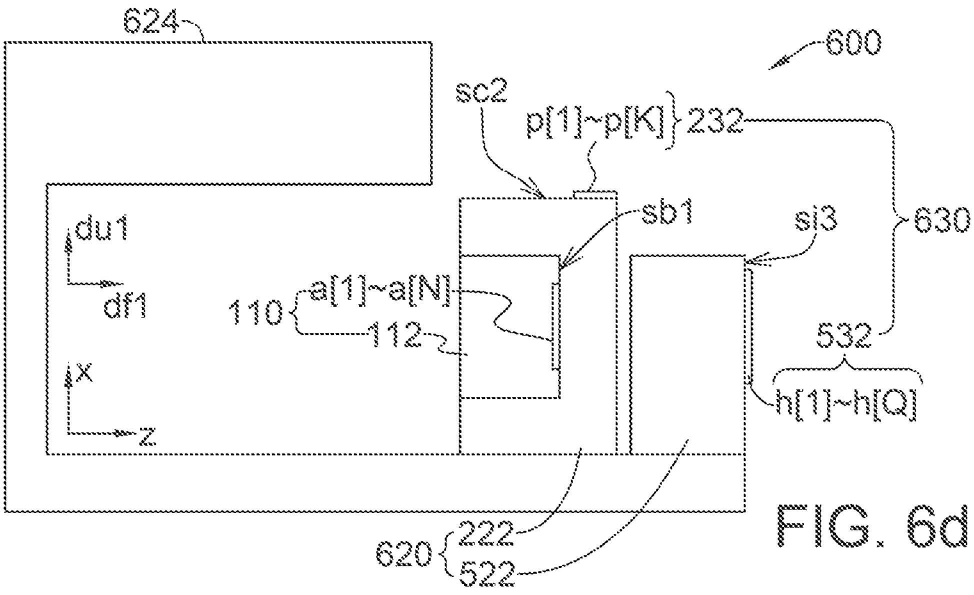
Figure 6E:
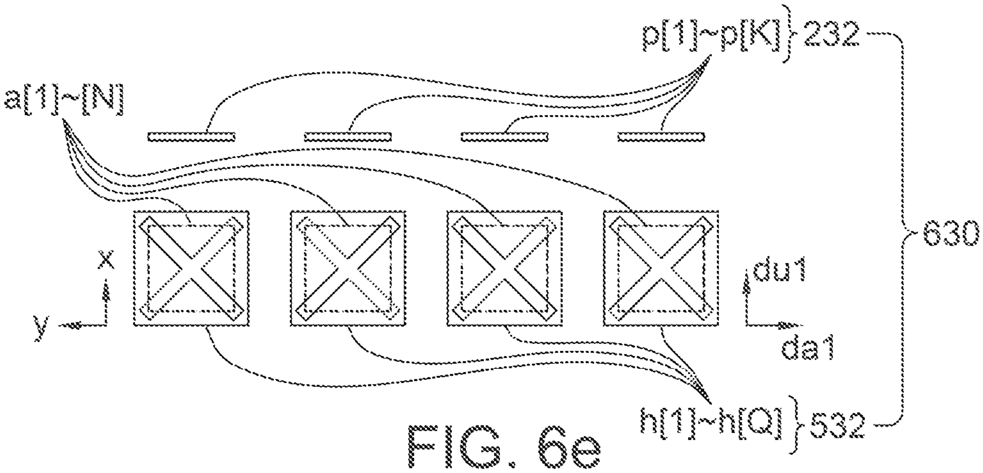

FIG. 6*b* depicts an assembly of support structure 620 and the auxiliary structure 630, and FIG. 6*c* depicts the same assembly with a portion of the support structure 620 and the auxiliary structure 630 hidden to demonstrate the AiM 110 fit into the cap 222. FIG. 6*d* depicts arrangement of the radiators a[1] to a[N] in the AiM 110, the thin members p[1] to p[K] in the upper front structure 232 of the auxiliary structure 630, the thin units h[1] to h[Q] in the forepart structure 532 of the auxiliary structure 630, along with the cap 222 and the accessory portion 522 in the support structure 620 by a side view (e.g., a view looking along the array direction da1). FIG. 6*e* depicts arrangement of the radiators a[1] to a[N], the thin members p[1] to p[K], and the thin units h[1] to h[Q] by a front view (e.g., a view looking along a direction opposite to the forward direction df1).

Figure 6F:
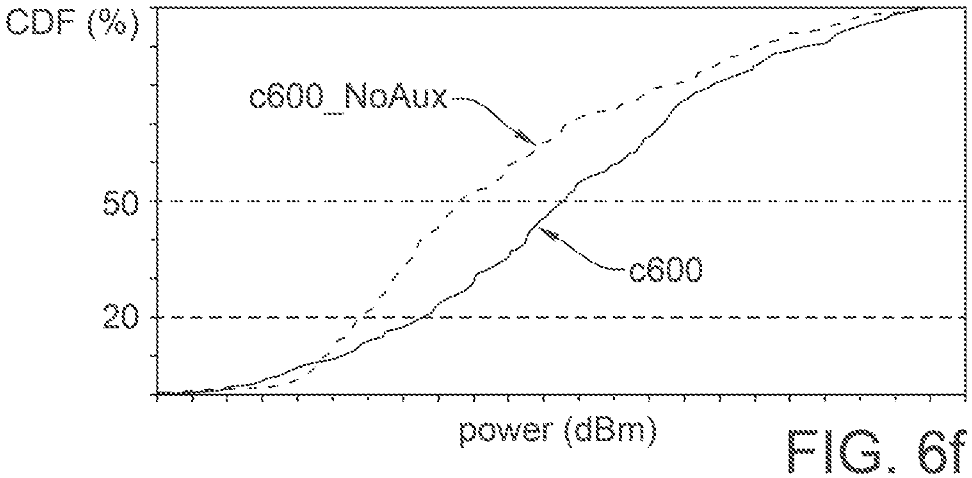

By including the upper front structure 232 and the forepart structure 532 in the auxiliary structure 630 of the antenna subsystem 600, the antenna subsystem 600 may benefit from collective effects of the upper front structure 232 and the forepart structure 532. As described by referring to FIGS. 2*a* to 2*i*, the thin members p[1] to p[K] in the upper front structure 232 may form an electromagnetic director orienting the radiation pattern G2_phi (FIG. 2*h*) of the first component of gain to the upward-forward direction d21 (FIG. 2*i*). In addition, as described by referring to FIGS. 5*a* to 5*g*, the one or more thin units h[1] to h[Q] in the forepart structure 532 may provide one or more parasitic antennas causing a spherical coverage provided by the antenna subsystem 600 to be broader than the spherical coverage provided by the AiM 110 alone. With the support structure 620 and the auxiliary structure 630 including the upper front structure 232 and the forepart structure 532 jointly accompanying the AiM 110 in the antenna subsystem 600, a CDF of the antenna subsystem 600 may be better than a CDF of excluding the auxiliary structure 630 from the antenna subsystem 600, i.e., a CDF of the antenna subsystem 600 without the auxiliary structure 630. FIG. 6*f* depicts two curves c600_NoAux and c600; the curve c600_NoAux may represent, at a frequency band of wireless communication, the CDF of the antenna subsystem 600 without the auxiliary structure 630, while the curve c600 may represent, also at the frequency band of wireless communication, the CDF of the complete antenna subsystem 600, with the auxiliary structure 630 included. Since CDF is more to the right the better, the curve c600 being right to the curve c600_NoAux, especially being significantly apart from the curve c600_NoAux to the right-hand side at 20% and 50% of the CDF, may indicate that the CDF of the complete antenna subsystem 600 is improved to be better than the CDF of the antenna subsystem 600 without the auxiliary structure 630.

In the embodiment shown in FIGS. 6*a* to 6*d*, the upper front structure 232 and the forepart structure 532 may be disposed on the cap 222 and the accessory portion 522 respectively. However, the invention is not so limited; for example, in an embodiment not depicted, both the upper front structure 232 and the forepart structure 532 may be placed on the cap 222 or on the accessory portion 522.

Figure 7A:
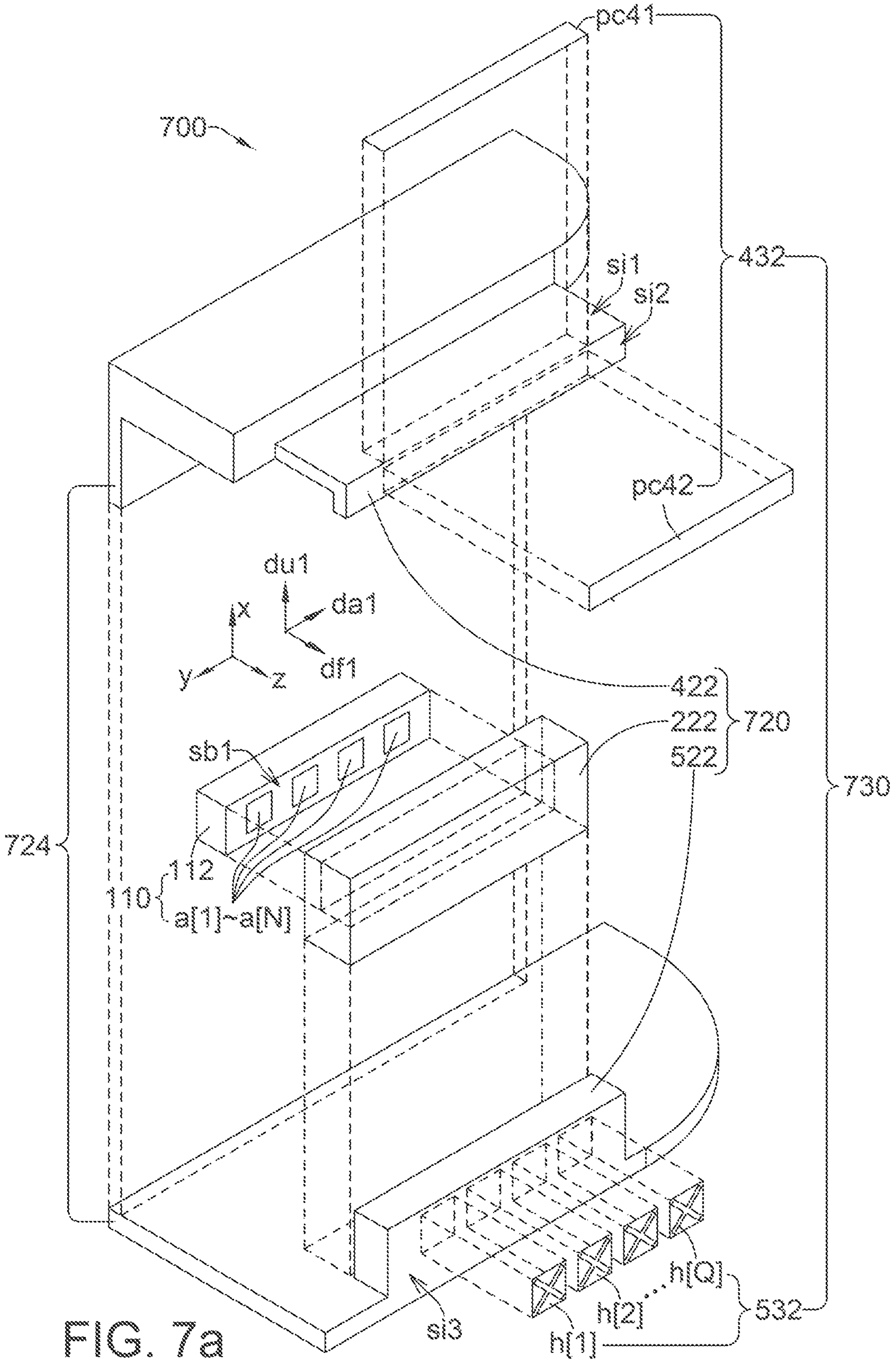
FIGS. 7*a* to 7*f* illustrate various aspects of an antenna subsystem according to an embodiment of the invention.

FIGS. 7*a* to 7*f* illustrate various aspects of an antenna subsystem 700 according to an embodiment of the invention. FIG. 7*a* depicts an exploded view of the antenna subsystem 700; the antenna subsystem 700 may include the AiM 110, a support structure 720 and an auxiliary structure 730. The antenna subsystem 700 may implement the antenna subsystem 100 shown in FIG. 1*a*, wherein the support structure 720 and the auxiliary structure 730 may implement the support structure 120 and the auxiliary structure 130, respectively. As shown in FIG. 7*a*, the support structure 720 may include the cap 222, the accessory portion 422 (previously described by referring to FIGS. 4*c* to 4*d*) and the accessory portion 522, and the auxiliary structure 730 may include the upper front structure 432 (previously described by referring to FIGS. 4*a* to 4*f*) and the forepart structure 532. Each of the accessory portions 422 and 522 may be a nonconductive (dielectric) portion of an interior structure 724 (e.g., a middle frame) of the UE 10 (FIG. 1*c*). The upper front structure 432 may include the two long thin members pc41 and pc42 respectively placed on the two surfaces si1 and si2 of the accessory portion 422, and the forepart structure 532 may include the one or more thin units h[1] to h[Q] placed on the surface si3 of the accessory portion 522. Each of the long thin members pc41 and pc42, each of the thin units h[1] to h[Q] and each of the radiators a[1] to a[N] may be mutually insulated.

Figure 7B:
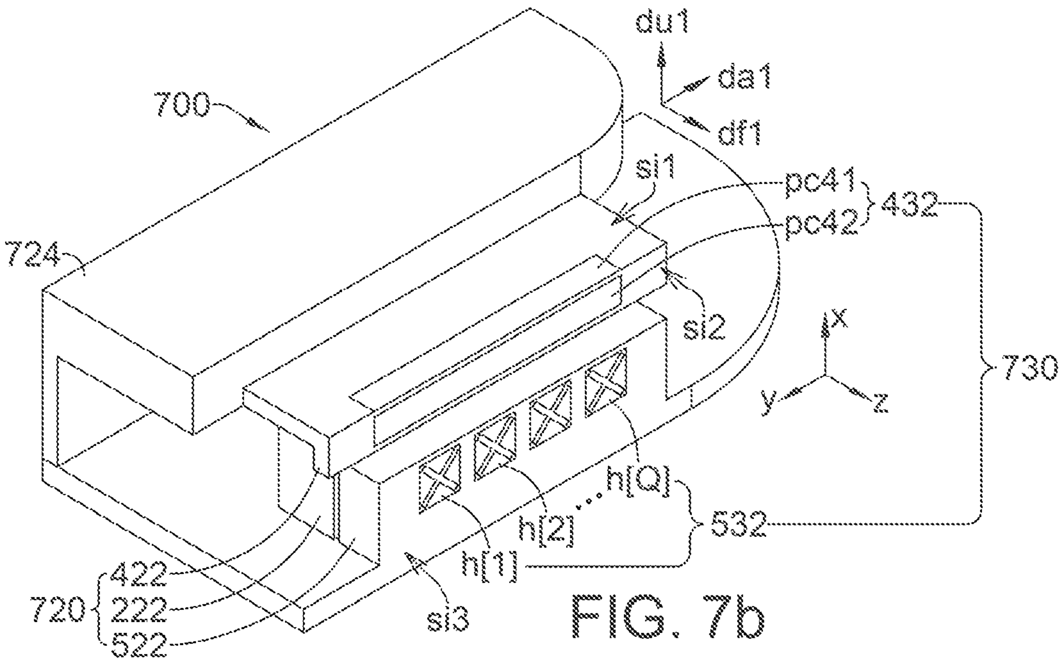
Figure 7C:
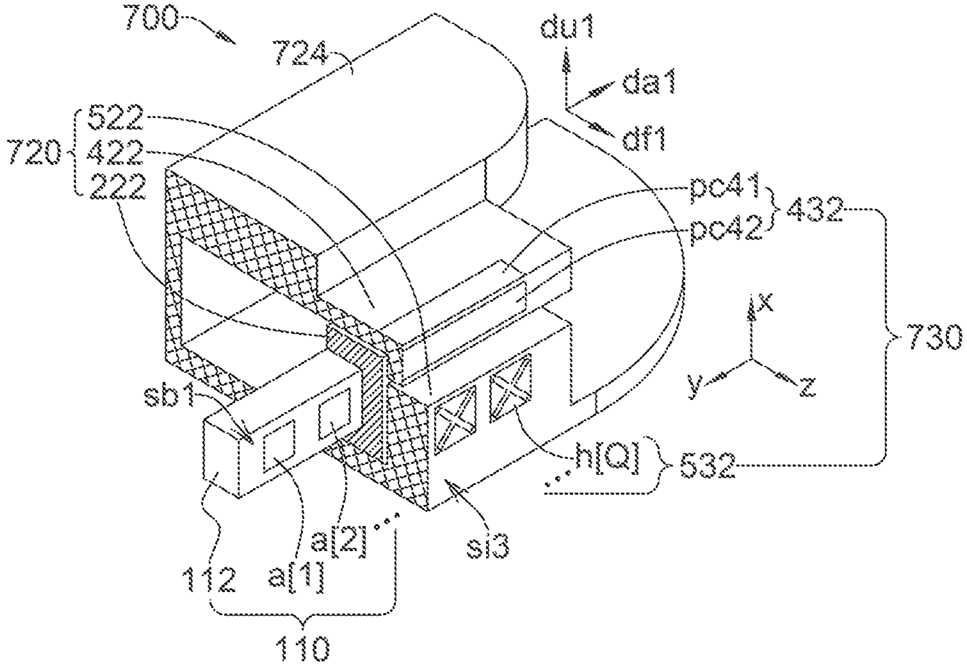
Figure 7D:
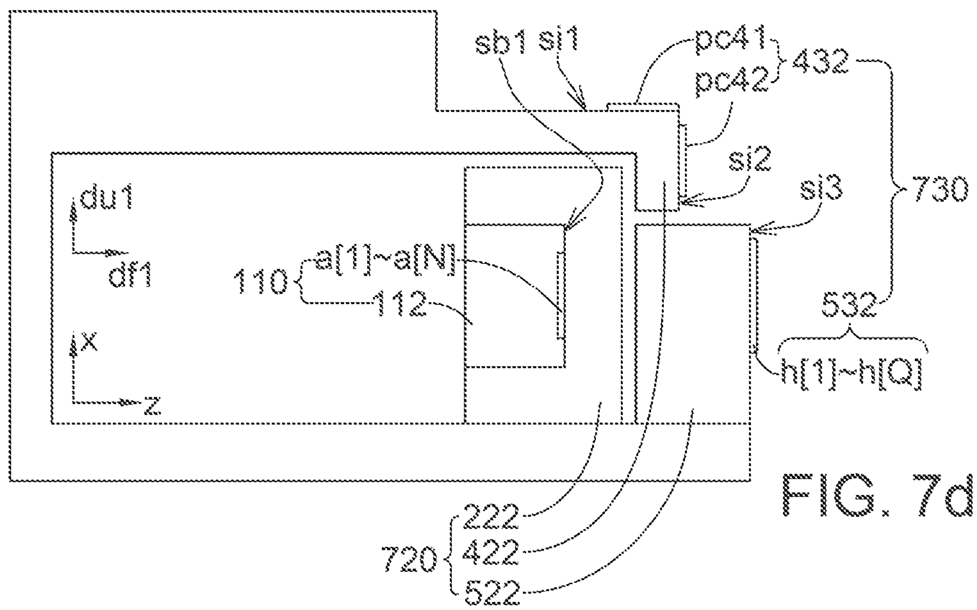
Figure 7E:
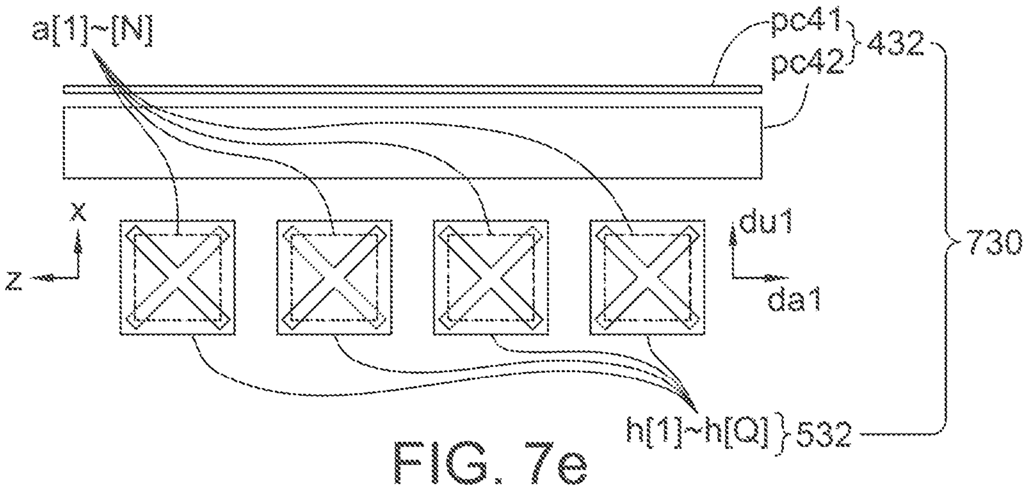

FIG. 7*b* depicts an assembly of support structure 720 and the auxiliary structure 730, and FIG. 7*c* depicts the same assembly with a portion of the support structure 720 and the auxiliary structure 730 hidden to demonstrate the AiM 110 fit into the cap 222. FIG. 7*d* depicts arrangement of the radiators a[1] to a[N] in the AiM 110, the long thin members pc41 and pc42 in the upper front structure 432 of the auxiliary structure 730, the thin units h[1] to h[Q] in the forepart structure 532 of the auxiliary structure 730, along with the cap 222 and the accessory portions 422 and 522 in the support structure 720 by a side view (e.g., a view looking along the array direction da1). FIG. 7*e* depicts arrangement of the radiators a[1] to a[N], the long thin members pc41 and pc42, and the thin units h[1] to h[Q] by a front view (e.g., a view looking along a direction opposite to the forward direction df1).

Figure 7F:
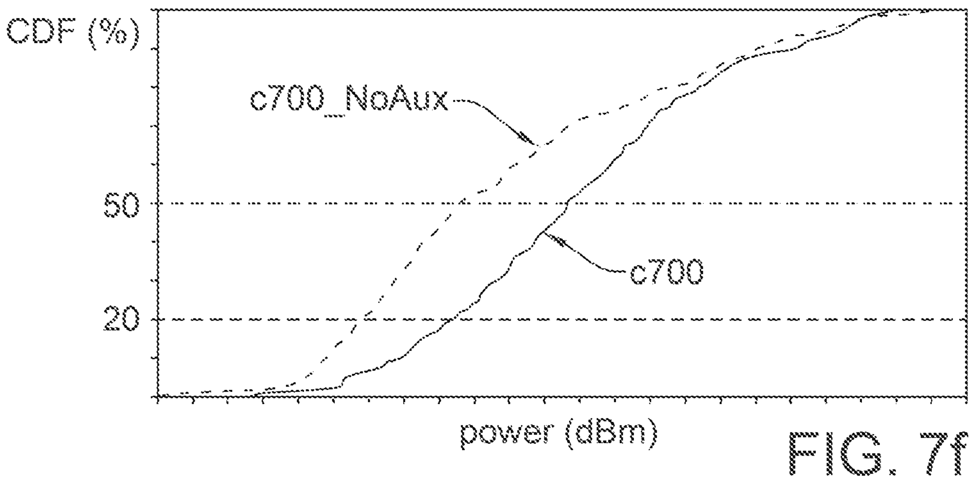

By including the upper front structure 432 and the forepart structure 532 in the auxiliary structure 730 of the antenna subsystem 700, the antenna subsystem 700 may benefit from collective effects of the upper front structure 432 and the forepart structure 532. As described by referring to FIGS. 4*a* to 4*f*, the long thin members pc41 and pc42 in the upper front structure 432 may form an electromagnetic reflector orienting the radiation pattern G4_phi (FIG. 4*e*) of the first component of gain to the downward-forward direction d41 (FIG. 4*f*), and may also form an electromagnetic director orienting the radiation pattern G4_theta (FIG. 4*e*) of the second component of gain to the upward-forward direction d42 (FIG. 4*f*). Besides, as described by referring to FIGS. 5*a* to 5*g*, the one or more thin units h[1] to h[Q] in the forepart structure 532 may be one or more parasitic antennas causing a spherical coverage provided by the antenna subsystem 700 to be broader than the spherical coverage provided by the AiM 110 alone. With the support structure 720 and the auxiliary structure 730 including the upper front structure 432 and the forepart structure 532 accompanying with the AiM 110 in the antenna subsystem 700, a CDF of antenna subsystem 700 may be better than a CDF of excluding the auxiliary structure 730 from the antenna subsystem 700, i.e., a CDF of the antenna subsystem 700 without the auxiliary structure 730. FIG. 7*f* depicts two curves c700_NoAux and c700; wherein the curve c700_NoAux may represent, at a frequency band of wireless communication, the CDF of the antenna subsystem 700 without the auxiliary structure 730, and the curve c700 may represent, at the same frequency band of wireless communication, the CDF of the complete antenna subsystem 700, including the auxiliary structure 730. As shown in FIG. 7*f*, the curve c700 being right to the curve c700_NoAux, especially being significantly apart from the curve c700_NoAux to the right-hand side at 20% and 50% of the CDF, may prove that the CDF of the complete antenna subsystem 700 is improved to be better than the CDF of the antenna subsystem 700 without the auxiliary structure 730.

In the embodiment shown in FIGS. 7*a* to 7*d*, the upper front structure 432 and the forepart structure 532 may be disposed on the accessory portions 422 and 522 respectively. However, the invention is not so limited; for example, in an embodiment not depicted, the upper front structure 432 and the forepart structure 532 may be placed on the cap 222 and the accessory portion 522 respectively; in another embodiment not depicted, both the upper front structure 432 and the forepart structure 532 may be placed on the cap 222; in still another embodiment not depicted, the accessory portions 422 and 522 may be merged into an integrated portion of the interior structure 724, and both the upper front structure 432 and the forepart structure 532 may be placed on the integrated portion.

To sum up, the invention may provide an antenna subsystem which may include a support structure and an auxiliary structure along with an AiM. The AiM may include one or more radiators for transmitting and/or receiving electromagnetic waves. The support structure may be disposed between the AiM and the auxiliary structure. The auxiliary structure may include an upper front structure and/or a forepart structure. The upper front structure may orient radiation patterns of different components of gain to different directions respectively, e.g., the upper front structure may be an electromagnetic director or reflector for the radiation pattern of a first component of gain, and/or, may be an electromagnetic director or reflector for the radiation pattern of a second component of gain. The forepart structure may form one or more parasitic antennas resonating with the one or more radiators. The upper front structure and/or the forepart structure may thereby cause radiation performance(s), such as spherical coverage and/or CDF, etc., of the antenna subsystem to be better than radiation performance(s) of the AiM alone. If AiM is utilized alone without auxiliary structure, a UE may need more than one AiMs to obtain satisfactory radiation coverage; on the other hand, by accompanying an AiM with an associated auxiliary structure positioned by an associated support structure to form an antenna subsystem according to the invention, a UE may only need fewer such antenna subsystems, or even a single one antenna subsystem, to achieve satisfactory radiation coverage.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An antenna subsystem with improved radiation performances, comprising:

an antenna-in-module (AiM);

an auxiliary structure, being conductive; and a support structure, being nonconductive and disposed between the AiM and the auxiliary structure; wherein:

the AiM comprises a base, and one or more radiators;

the one or more radiators are conductive;

the antenna subsystem provides a spherical coverage by a combination of a first component of gain and a second component of gain; and the auxiliary structure is insulated from the one or more radiators, and is configured for orienting a radiation pattern of the first component of gain and a radiation pattern of the second component of gain to two different directions respectively;

the one or more radiators are placed on a front surface of the base, and distribute along an array direction;

the front surface of the base is perpendicular to a forward direction;

the auxiliary structure comprises an upper front structure;

on a geometric plane perpendicular to the array direction, a position of the upper front structure is away from a position of the one or more radiators along an upward-forward direction, and the upper front structure is arranged to direct the radiation pattern of the first component of gain to another upward-forward direction, or to reflect the radiation pattern of the first component of gain to a downward-forward direction.

2. The antenna subsystem of claim 1, wherein:

the upper front structure is arranged to be an electromagnetic director for the radiation pattern of the first component of gain.

3. The antenna subsystem of claim 1, wherein:

the upper front structure is arranged to be an electromagnetic reflector for the radiation pattern of the first component of gain.

4. The antenna subsystem of claim 3, wherein:

the upper front structure is further arranged to be an electromagnetic director, or an electromagnetic reflector, for the radiation pattern of the second component of gain.

5. The antenna subsystem of claim 1, wherein:

at least one of the two different directions is substantially nonparallel to the forward direction.

6. The antenna subsystem of claim 1, wherein:

the first component of gain is contributed by phi-direction electrical field; and the second component of gain is contributed by theta-direction electrical field.

7. The antenna subsystem of claim 1, wherein:

on the geometric plane perpendicular to the array direction, the upper front structure is further arranged to direct the radiation pattern of the second component of gain to still another upward-forward direction, or to reflect the radiation pattern of the second component of gain to another downward-forward direction.

8. An antenna subsystem with improved radiation performances, comprising:

an antenna-in-module (AiM);

an auxiliary structure, being conductive; and a support structure, being nonconductive and disposed between the AiM and the auxiliary structure; wherein:

the AiM comprises a base, and one or more radiators;

the one or more radiators are conductive;

the antenna subsystem provides a spherical coverage by a combination of a first component of gain and a second component of gain; and the auxiliary structure is insulated from the one or more radiators, and is configured for orienting a radiation pattern of the first component of gain and a radiation pattern of the second component of gain to two different directions respectively;

the one or more radiators are placed on a front surface of the base, and distribute along an array direction;

the front surface of the base is perpendicular to a forward direction;

the auxiliary structure comprises one of the following:

a set of one or more thin members which are mutually insulated, are disposed on a predetermined surface of the support structure, and distribute substantially along the array direction, with the predetermined surface being perpendicular to a predetermined direction substantially nonparallel to the forward direction; or a long thin member which is disposed on a first surface of the support structure, and extends substantially along the array direction, with the first surface being perpendicular to a first direction substantially nonparallel to the forward direction.

9. The antenna subsystem of claim 8, wherein:

the support structure comprises a cap;

the cap comprises an open cavity, and the cap is enclosed by a combination of a plurality of cap outward surfaces;

the plurality of cap outward surfaces comprises a cap front surface, a cap rear surface having a cavity opening, one or more cap side surfaces extending between a perimeter of the cap front surface and a perimeter of the cap rear surface, a cavity end surface, and one or more cavity side surfaces extending from a perimeter of the cavity opening to a perimeter of the cavity end surface;

an outward surface of the AiM is attached to the cavity end surface; and the predetermined surface is one of the one or more cap side surfaces.

10. The antenna subsystem of claim 8, wherein:

the auxiliary structure further comprises a second long thin member;

the second long thin member is insulated from the long thin member, is disposed on a second surface of the support structure, and extends substantially along the array direction; and the second surface is perpendicular to a second direction; and the first direction and the second direction are substantially nonparallel.

11. The antenna subsystem of claim 10, wherein:

the AiM is disposed inside a user equipment (UE);

the UE comprises an interior structure;

the support structure comprises an accessory portion of the interior structure; and the first surface and the second surface are two nonparallel surfaces of the accessory portion.

12. The antenna subsystem of claim 8, wherein:

the one or more radiators distribute along the array direction over a first length;

the long thin member extends substantially along the array direction by a second length; and the second length is longer than or equal to the first length.

13. An antenna subsystem with improved radiation performances, comprising:

an antenna-in-module (AiM);

an auxiliary structure, being conductive; and a support structure, being nonconductive and disposed between the AiM and the auxiliary structure; wherein:

the AiM comprises a base, and one or more radiators;

the one or more radiators are conductive;

the antenna subsystem provides a spherical coverage by a combination of a first component of gain and a second component of gain; and the auxiliary structure is insulated from the one or more radiators, and is configured for orienting a radiation pattern of the first component of gain and a radiation pattern of the second component of gain to two different directions respectively;

the one or more radiators are placed on a front surface of the base, and distribute along an array direction;

the front surface of the base is perpendicular to a forward direction;

the auxiliary structure comprises one or more thin units;

the one or more thin units are mutually insulated, are disposed on a predetermined surface of the support structure, and distribute substantially along the array direction;

the predetermined surface is substantially parallel to the front surface of the base;

the AiM is disposed inside a user equipment (UE) which is enclosed by an external surface; and along the forward direction, a distance between the predetermined surface and the external surface is shorter than a distance between the front surface and the external surface.

14. The antenna subsystem of claim 13, wherein each of the one or more thin units comprises an opening.

* * * * *